(12) United States Patent
Nanba

(10) Patent No.: US 6,844,986 B2
(45) Date of Patent: Jan. 18, 2005

(54) ZOOM LENS AND IMAGE TAKING APPARATUS USING THE SAME

(75) Inventor: Norihiro Nanba, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/016,156

(22) Filed: Nov. 1, 2001

(65) Prior Publication Data

US 2002/0122262 A1 Sep. 5, 2002

(30) Foreign Application Priority Data

Nov. 2, 2000 (JP) ........................................ 2000-335379

(51) Int. Cl.[7] .............................................. G02B 15/14
(52) U.S. Cl. ..................................... 359/689; 359/676
(58) Field of Search ................................ 359/680–683, 359/676, 685, 687, 689

(56) References Cited

U.S. PATENT DOCUMENTS

| | | | | |
|---|---|---|---|---|
| 4,647,160 A | | 3/1987 | Ikemori ....................... | 359/689 |
| 4,810,072 A | | 3/1989 | Takahashi ................... | 359/689 |
| 4,824,223 A | | 4/1989 | Doctor et al. ............... | 359/689 |
| 4,838,666 A | | 6/1989 | Shiraishi ..................... | 359/689 |
| 4,969,878 A | | 11/1990 | Schmidt et al. ............. | 604/264 |
| 4,999,007 A | | 3/1991 | Aoki et al. .................. | 359/676 |
| 5,270,863 A | | 12/1993 | Uzawa ........................ | 359/682 |
| 5,434,710 A | | 7/1995 | Zozawa ....................... | 359/689 |
| 5,523,888 A | * | 6/1996 | Nishio ......................... | 359/686 |
| 5,666,232 A | | 9/1997 | Toyama ....................... | 359/689 |
| 5,668,668 A | * | 9/1997 | Shibayama et al. ......... | 359/683 |
| 5,835,287 A | | 11/1998 | Ohtake ........................ | 359/782 |
| 6,118,593 A | * | 9/2000 | Tochigi ....................... | 359/687 |
| 6,178,049 B1 | * | 1/2001 | Mukaiya et al. ............ | 359/687 |
| 6,229,655 B1 | | 5/2001 | Kohno et al. ............... | 359/689 |
| 6,308,011 B1 | | 10/2001 | Wachi et al. ................ | 396/72 |
| 2001/0013978 A1 | * | 8/2001 | Mihara ........................ | 359/680 |
| 2001/0013979 A1 | | 8/2001 | Koreeda ..................... | 359/680 |

FOREIGN PATENT DOCUMENTS

| | | |
|---|---|---|
| JP | 62-200316 | 9/1987 |
| JP | 2-118509 | 5/1990 |
| JP | 7-261083 | 10/1995 |
| JP | 9-101455 | 4/1997 |
| JP | 11-287953 | 10/1999 |
| JP | 2000-111798 | 4/2000 |
| JP | 2000-267009 | 9/2000 |

* cited by examiner

Primary Examiner—Georgia Epps
Assistant Examiner—William Choi
(74) Attorney, Agent, or Firm—Morgan & Finnegan, LLP

(57) ABSTRACT

In order to provide a zoom lens which has excellent optical performance with a compact configuration using a small number of constituent lenses, a zoom lens according to the present invention comprises a first lens unit having a negative optical power, a second lens unit having a positive optical power, and a third lens unit having a positive optical power, which are sequentially arranged from the object side, wherein the gap between the first and second lens units is decreased, the space between the second and third lens units is increased in zooming from the side angle end to the telephoto end, the third lens unit has a cemented lens formed by cementing a positive lens element to a negative lens element, and is moved along the optical axis for zooming, and letting $NL_i$ be the number of lensess constituting the ith lens unit, a condition, $$NL3 < NL2 \leq NL1$$

is satisfied.

29 Claims, 21 Drawing Sheets

ZOOM LENS AND IMAGE TAKING APPARATUS USING THE SAME

BACKGROUND OF THE INVENTION

1. Field of the Invention

The present invention relates to a zoom lens suitable for a still camera, video camera, a digital still camera, and the like and, more particularly, to a zoom lens suitable for a film still camera, video camera, digital camera, or the like, which has three lens units including a lens unit with a negative optical power (in the specification, the optical power is equal to the reciprocal of a focal length) preceding other types of lens units, in particular, and optimizes the lens arrangement of these lens units to reduce the size of the overall lens system.

2. Related Background Art

With recent advances in the performance of cameras (optical devices) such as video cameras, digital cameras, and electronic still cameras using photoelectric conversion elements such as solid-stage image pickup elements, optical systems used for them have been required to attain high optical performance and miniaturization.

In a camera of this type, various optical members such as a low-pass filter and color correction filter are required to be located between the final lens portion and an image pickup element. Therefore, as an optical system used for this purpose, a lens system is required to have an optically relatively long backfocus. In addition, in a camera using a color image pickup element, to avoid color shading, an optical system used for this camera is required to exhibit good telecentricity on the image surface side.

Conventionally, various lenses of so-called short zoom type lenses have been proposed, each of which is comprised of two lens units, i.e., a first unit having a negative optical power and a second unit having a positive optical power, and designed to perform zooming or magnification changing by changing the lens distance of both units. In such a short zoom type optical system, the system performs zooming by moving the second unit having a positive optical power and corrects the image point according to zooming by moving the first unit having a negative optical power. In the lens configuration constituted by these two lens units, the zoom ratio is about 2×. Three-unit zoom lenses are disclosed in Japanese Patent Publication No. 7-3507 (corresponding to U.S. Pat. No. 4,810,072), Japanese Patent Publication No. 6-40170 (corresponding to U.S. Pat. No. 4,647,160), and the like, each of which has a third unit having a negative or positive optical power on the image side to correct aberration due to a high zoom ratio, thereby realizing a compact structure as a whole while ensuring a higher zoom ratio.

Since these three-unit zoom lenses are mainly designed for 35-mm film photographs, it is hardly said that such a zoom lens realizes both a backfocus length required for an optical system using a solid-stage image pickup element and good telecentric characteristic.

Japanese Patent Application Laid-Open No. 63-135913 (corresponding to U.S. Pat. No. 4,838,666), Japanese Patent Application Laid-Open No. 7-261083, and the like disclose three-unit zoom lens systems, each of which is comprised of three lens units respectively having negative, positive, and positive optical powers and satisfies both the backfocus requirement and the telecentric characteristic requirement. An optical system is also disclosed in Japanese Patent Application Laid-Open No. 3-288113 (corresponding to U.S. Pat. No. 5,270,863), which performs zooming by fixing the first unit having a negative optical power, of a three-unit zoom lens having lens units with negative, positive, and positive optical powers, and moving the second and third units having positive optical powers.

The present applicant has disclosed an image taking lens having a three-unit configuration with negative, positive, and positive optical powers in Japanese Patent Application Laid-Open No. 2000-111798. According to this image taking lens, a zoom lens which has a zoom ratio of 2× or more and has realized a compact structure by minimizing the total length is implemented while a lens back long enough to insert a filter or the like on the image surface side is ensured and a telecentric characteristic required for a solid-state image pickup element is obtained.

U.S. Pat. No. 4,969,878 discloses a three-unit zoom lens having lenses with negative, positive, and positive optical powers sequentially arranged from the object side to the image side, in which the third unit reciprocates along the optical axis with a convex locus on the object side in zooming.

In the three-unit zoom lenses disclosed in Japanese Patent Application Laid-Open No. 63-135913, Japanese Patent Application Laid-open No. 7-261083, and Japanese Patent Application Laid-Open No. 3-288113, the number of lenses constituting each lens unit is relatively large, and hence the total lens length tends to be long.

In the optical system disclosed in Japanese Patent Application Laid-Open No. 7-261083, since focusing on a near object is performed by moving the first unit having a negative optical power while fixing the third unit having a positive optical power, the mechanical structure tends to be complicated owing to the movements of lens units in zooming as well.

U.S. Pat. No. 4,999,007 discloses a three-unit zoom lens with negative, positive, and positive optical powers, in which each of the first and second units is formed by a single lens.

However, the zoom lens disclosed in this reference is relatively long in total lens length at the wide angle end. In addition, since the first unit is greatly spaced apart from the aperture stop at the wide angle end, the incident height of an off-axis ray is high, and the diameter of the lens forming the first unit becomes large. The size of the overall lens system therefore tends to be large. Furthermore, since each of the first and second units is formed by one lens, aberration correction is insufficient in each lens unit. Variations in magnification chromatic aberration on zooming, in particular, tend to occur in the first unit in which variations in height from an off-axis ray are high. Since the first unit is formed by one negative lens, aberration correction is not sufficiently performed within the lens unit. Variations in magnification chromatic aberration therefore tend to increase in the overall system.

A projection optical system having a three-unit configuration with negative, positive, and positive optical powers is disclosed in U.S. Pat. No. 4,824,223. In this optical system, the first unit is formed by one negative lens, and hence aberration correction in the lens unit is insufficient, and the zoom ratio is about 1.7×. That is, this optical system is not suitable for high zooming operation.

In addition, three-unit zoom lenses each having lenses with negative, positive, positive optical powers, sequentially arranged from the object side, and including a third unit comprised of a plurality of lenses including negative and positive lenses are disclosed in U.S. Pat. No. 4,838,666, Japanese Patent Application Laid-Open No. 62-200316, Japanese Patent Application Laid-Open No. 2-118509, U.S. Pat. Nos. 4,999,007, 5,835,287, Japanese Patent Application Laid-Open No. 5-173073 (corresponding to U.S. Pat. No. 5,434,710), and Japanese Patent Publication No. 60-42451.

According to U.S. Pat. No. 4,838,666, Japanese Patent Application Laid-Open No. 62-200316, Japanese Patent Application Laid-Open No. 2-118509, since the third unit is fixed during zooming, it tends to be difficult to maintain good performance throughout the entire zooming range in high zooming operation.

According to the U.S. Pat. Nos. 4,999,007 and 5,835,287, since the number of constituent lenses of the first and second units is as small as one or two, it is difficult to satisfy both the high zoom ratio requirement and the performance requirement. According to Japanese Patent Application Laid-Open No. 5-173073, since the third unit is constituted by positive and negative lenses spaced part from each other by an air gap, a deterioration in performance tends to occur due to relative decentering of these lenses.

According to Japanese Patent Publication No. 60-42451, since the number of constituent lenses of the second unit is as large as 4 to 5, a problem arises in terms of miniaturization.

SUMMARY OF THE INVENTION

It is an object of the present invention to provide a zoom lens which has excellent optical performance with a compact configuration using a small number of constituent lenses.

In order to achieve the above object, a zoom lens according to the present invention comprises a first lens unit of a negative optical power, a second lens unit of a positive optical power, and a third lens unit of a positive optical power, which are sequentially arranged from the object side to the image side, wherein the space between the first and second lens units is decreased and the space between the second and third lens units is increased in zooming from the wide angle end to the telephoto end. The third lens unit has a cemented lens formed by cementing a positive lens element to a negative lens element, and is moved along the optical axis for zooming. Letting NLi be the number of lenses constituting the ith lens unit, a condition, $$NL3 < NL2 \leq NL1$$

is satisfied.

DETAILED DESCRIPTION OF THE PREFERRED EMBODIMENTS

Figure 1:
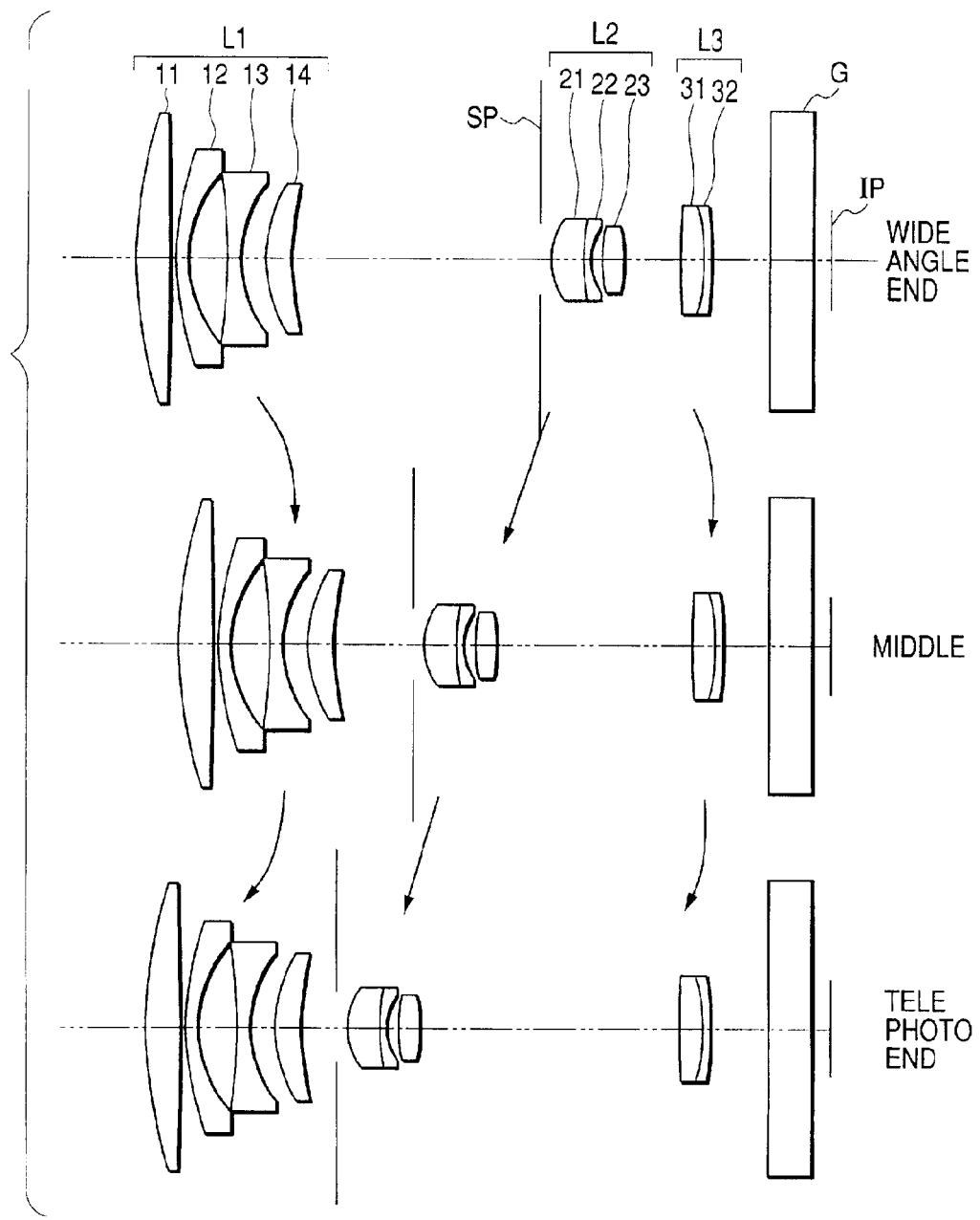
FIG. 1 is a sectional view of a zoom lens according to the first numerical embodiment.
Figure 2:
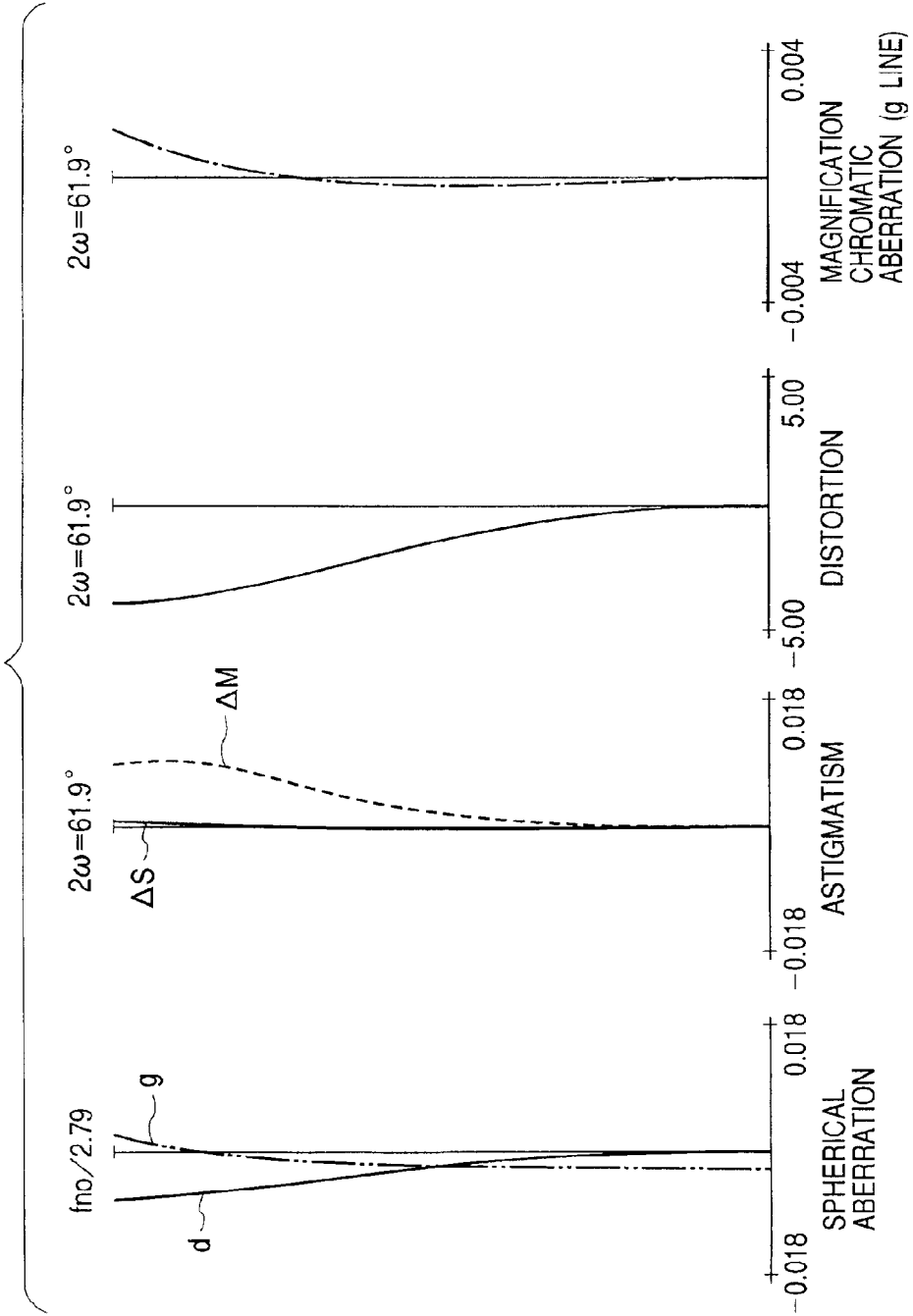
FIG. 2 is an aberration diagram of the zoom lens according to the first numerical embodiment at the wide angle end.
Figure 3:
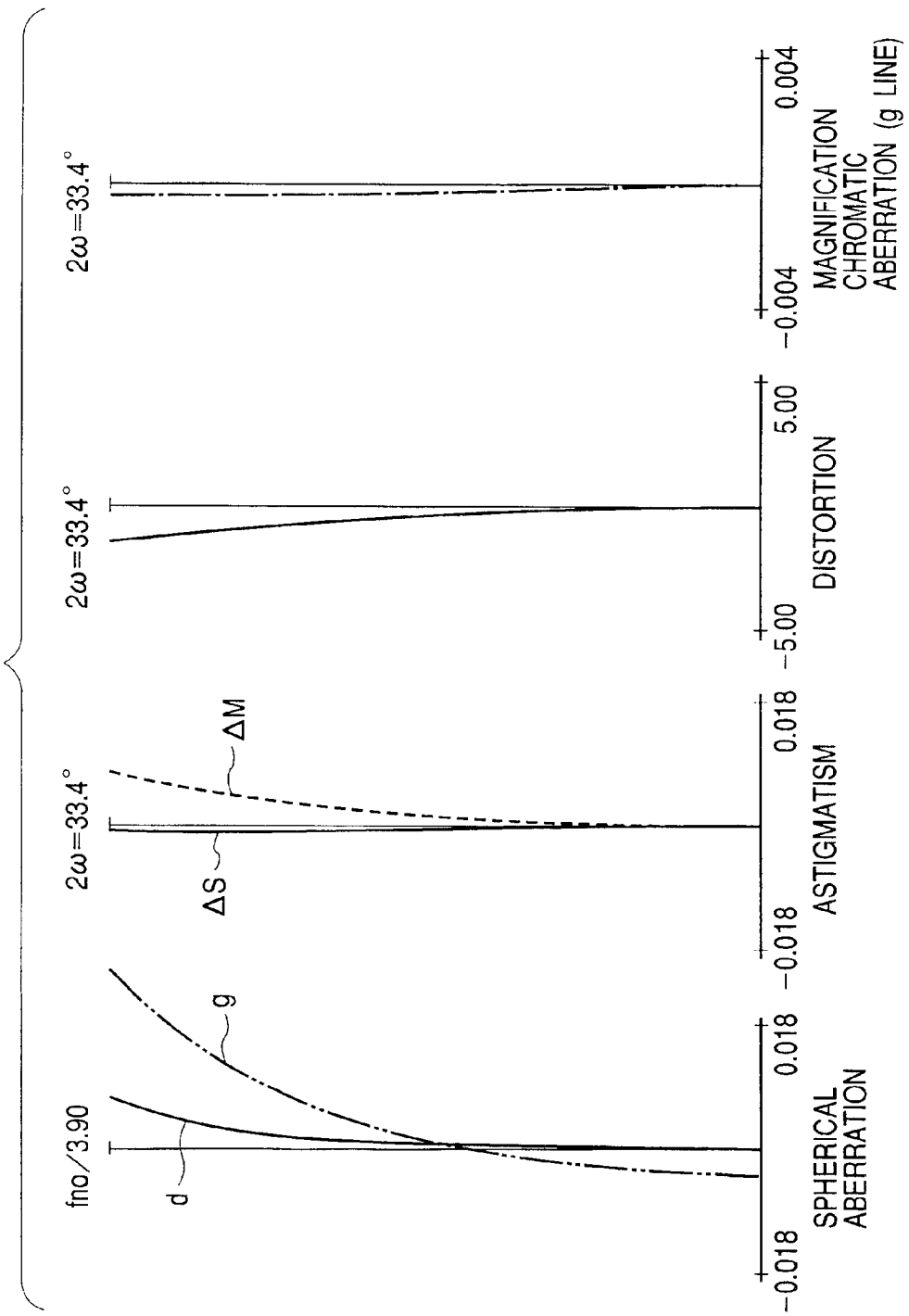
FIG. 3 is an aberration diagram of the zoom lens according to the first numerical embodiment at the middle zoom position.
Figure 4:
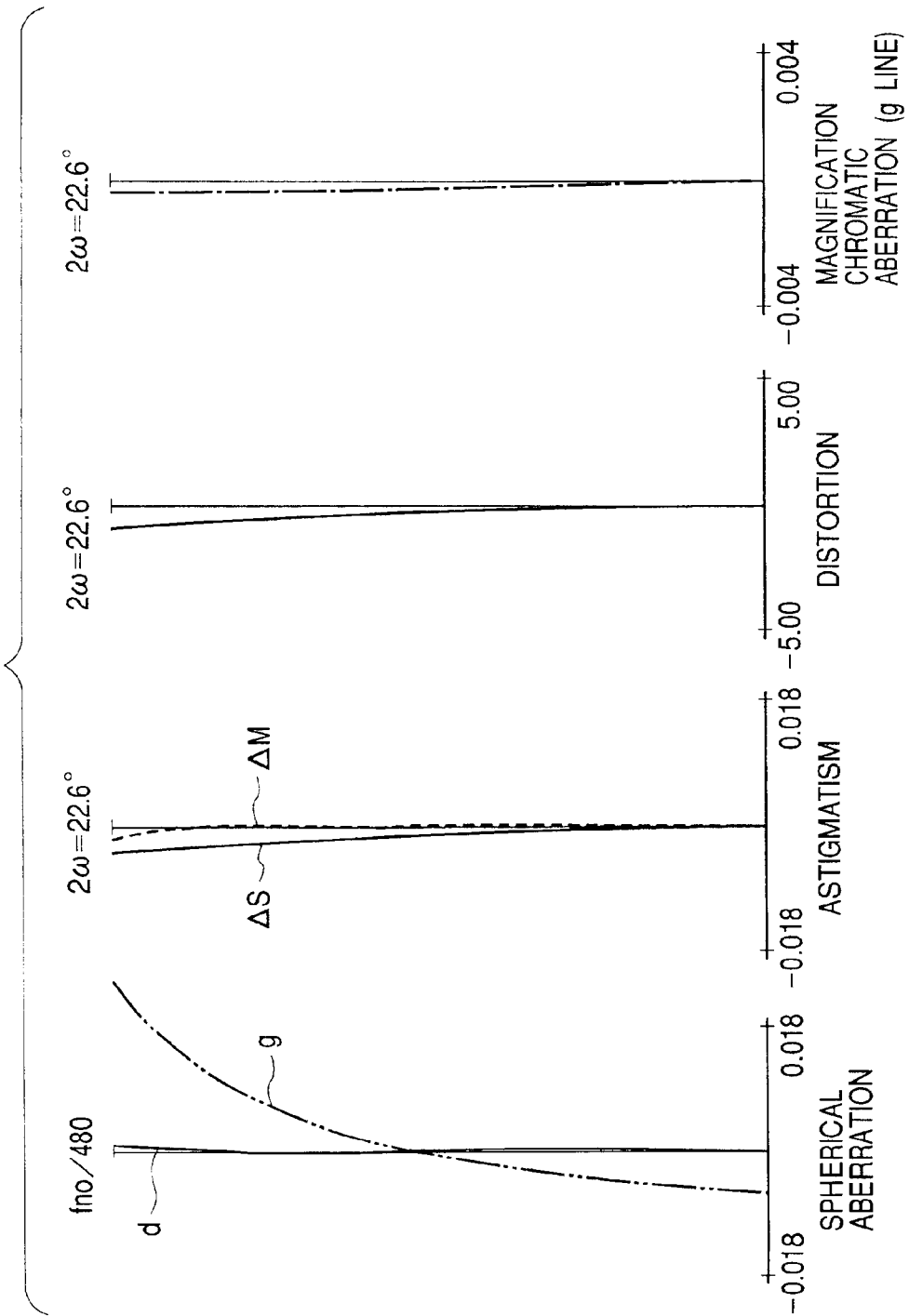
FIG. 4 is an aberration diagram of the zoom lens according to the first numerical embodiment at the telephoto end.

FIG. 1 is a sectional view of the lenses of a zoom lens according to the first numerical embodiment. FIGS. 2 to 4 are aberration diagrams of the zoom lens according to the first numerical embodiment at the wide angle end, middle zoom position, and telephoto end, respectively.

Figure 5:
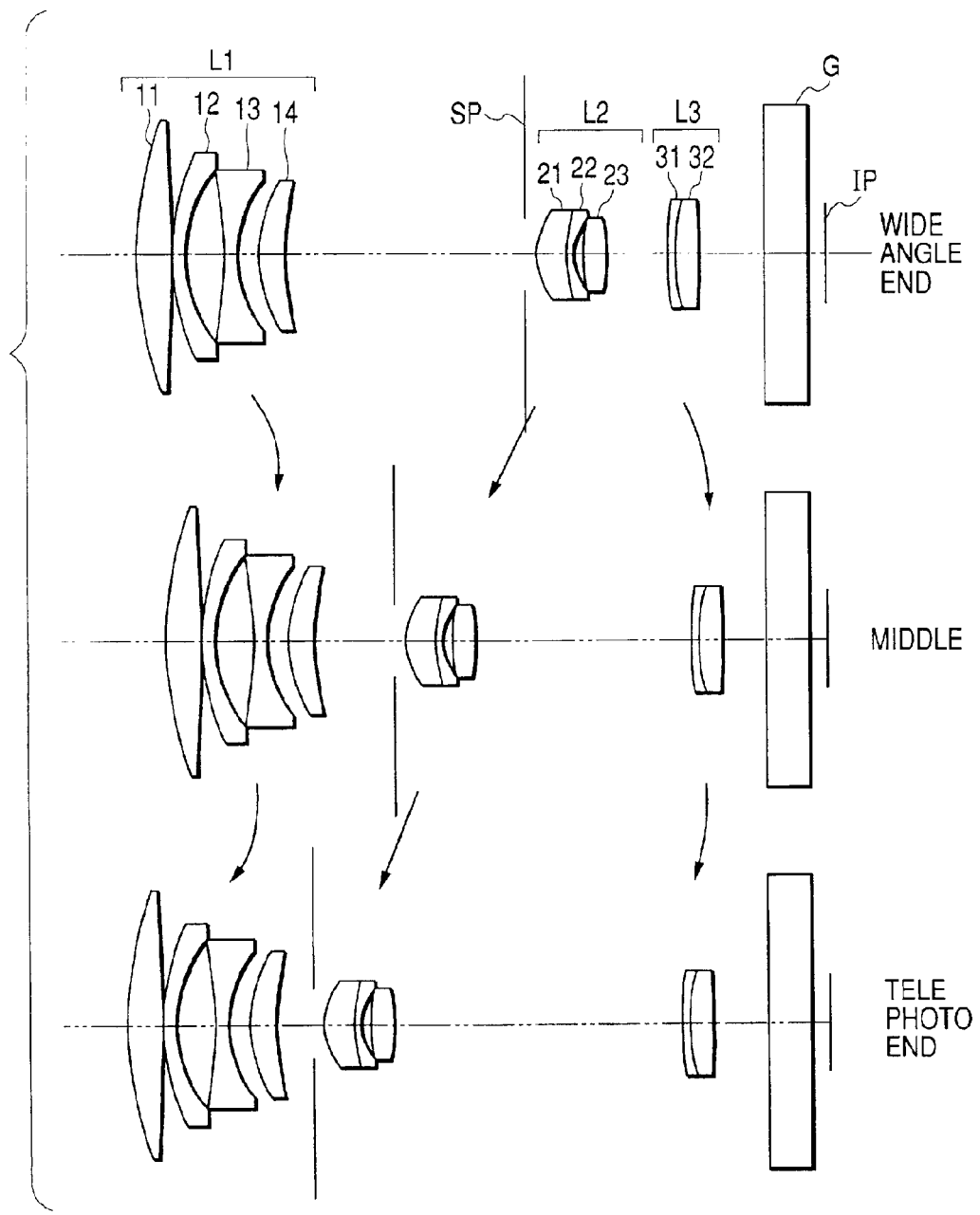
FIG. 5 is a sectional view of a zoom lens according to the second numerical embodiment.
Figure 6:
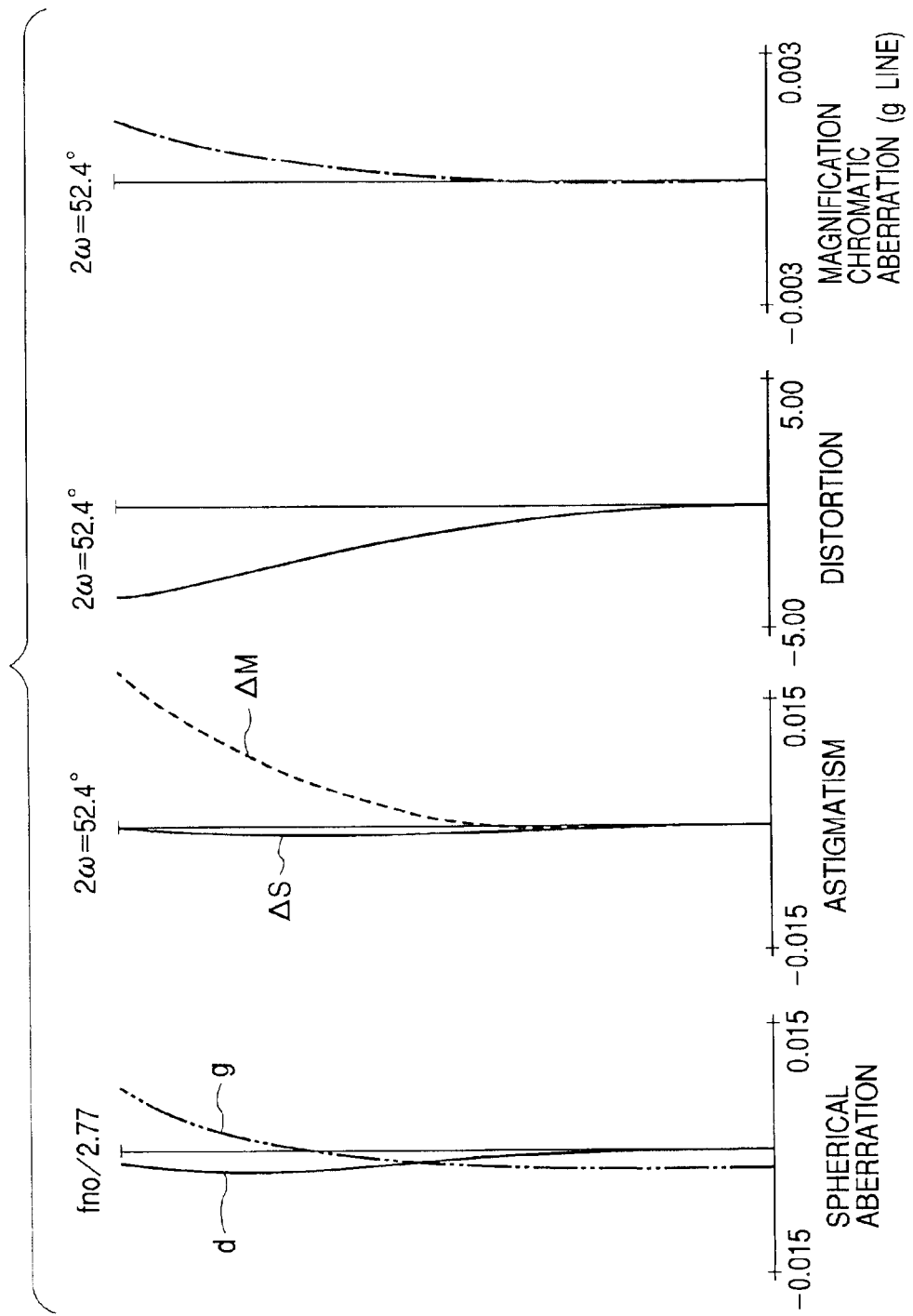
FIG. 6 is an aberration diagram of the zoom lens according to the second numerical embodiment at the wide angle end.
Figure 7:
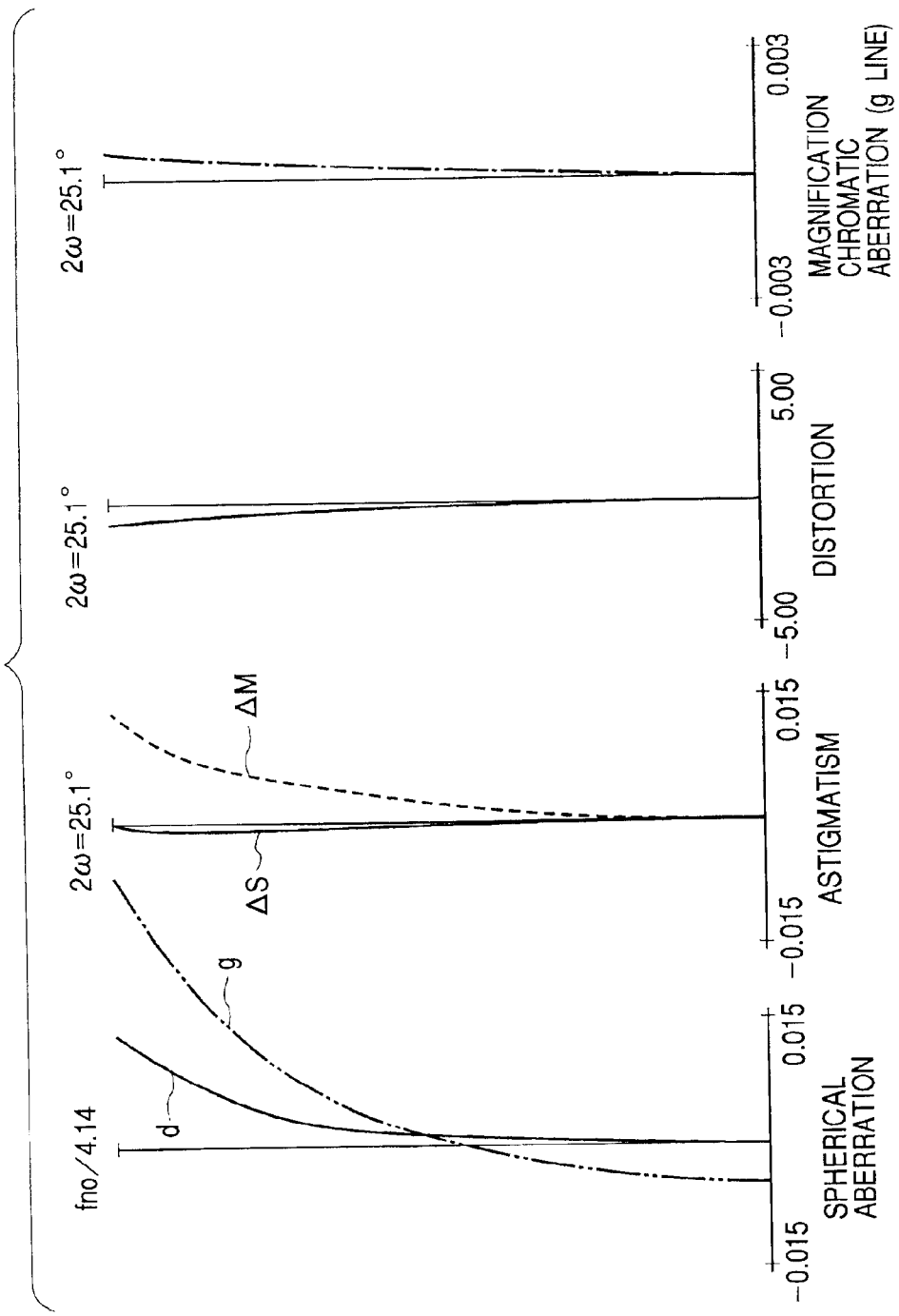
FIG. 7 is an aberration diagram of the zoom lens according to the second numerical embodiment at the middle zoom position.
Figure 8:
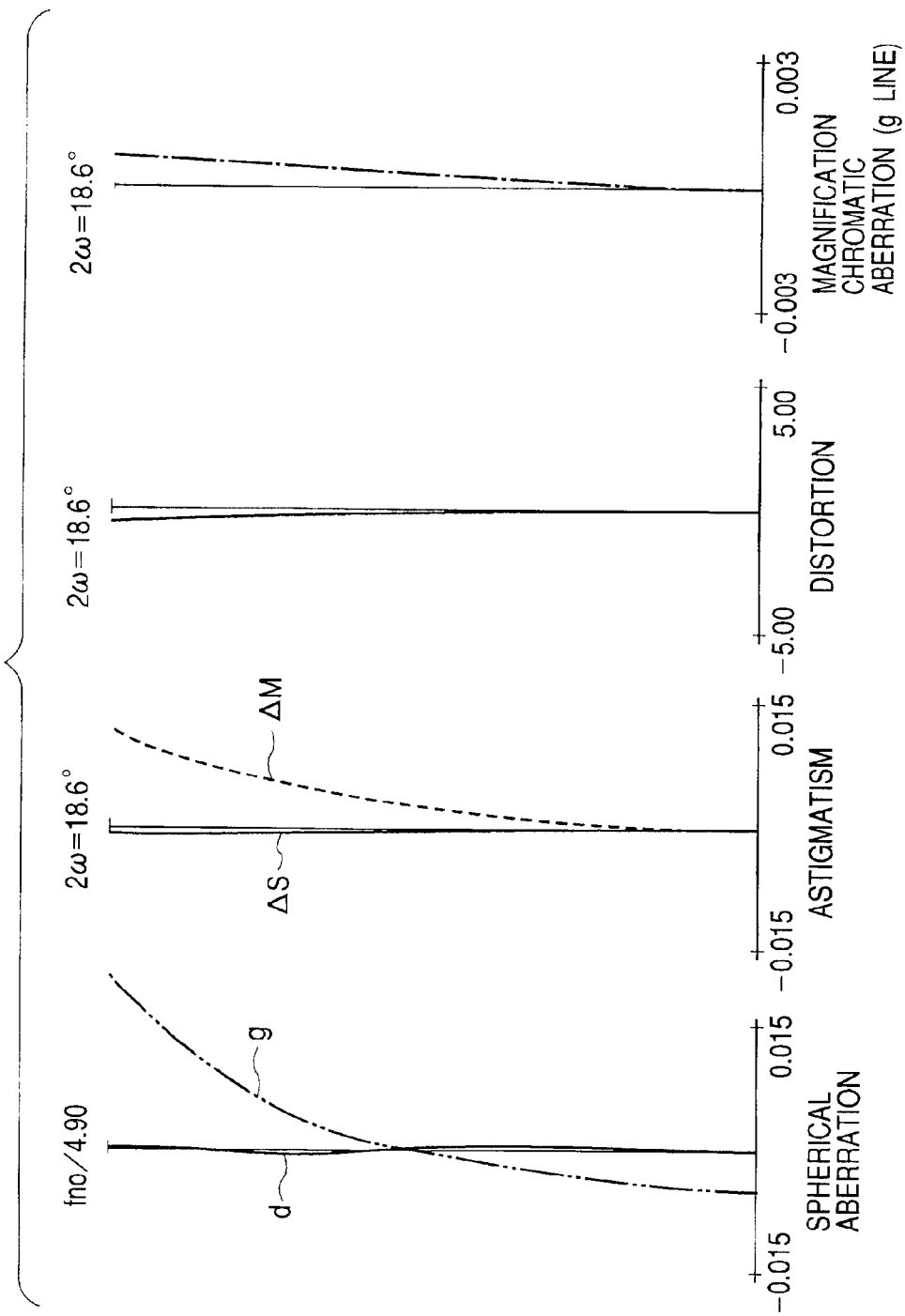
FIG. 8 is an aberration diagram of the zoom lens according to the second numerical embodiment at the telephoto end.

FIG. 5 is a sectional view of the lenses of a zoom lens according to the second numerical embodiment. FIGS. 6 to 8 are aberration diagrams of the zoom lens according to the second numerical embodiment at the wide angle end, middle zoom position, and telephoto end, respectively.

Figure 9:
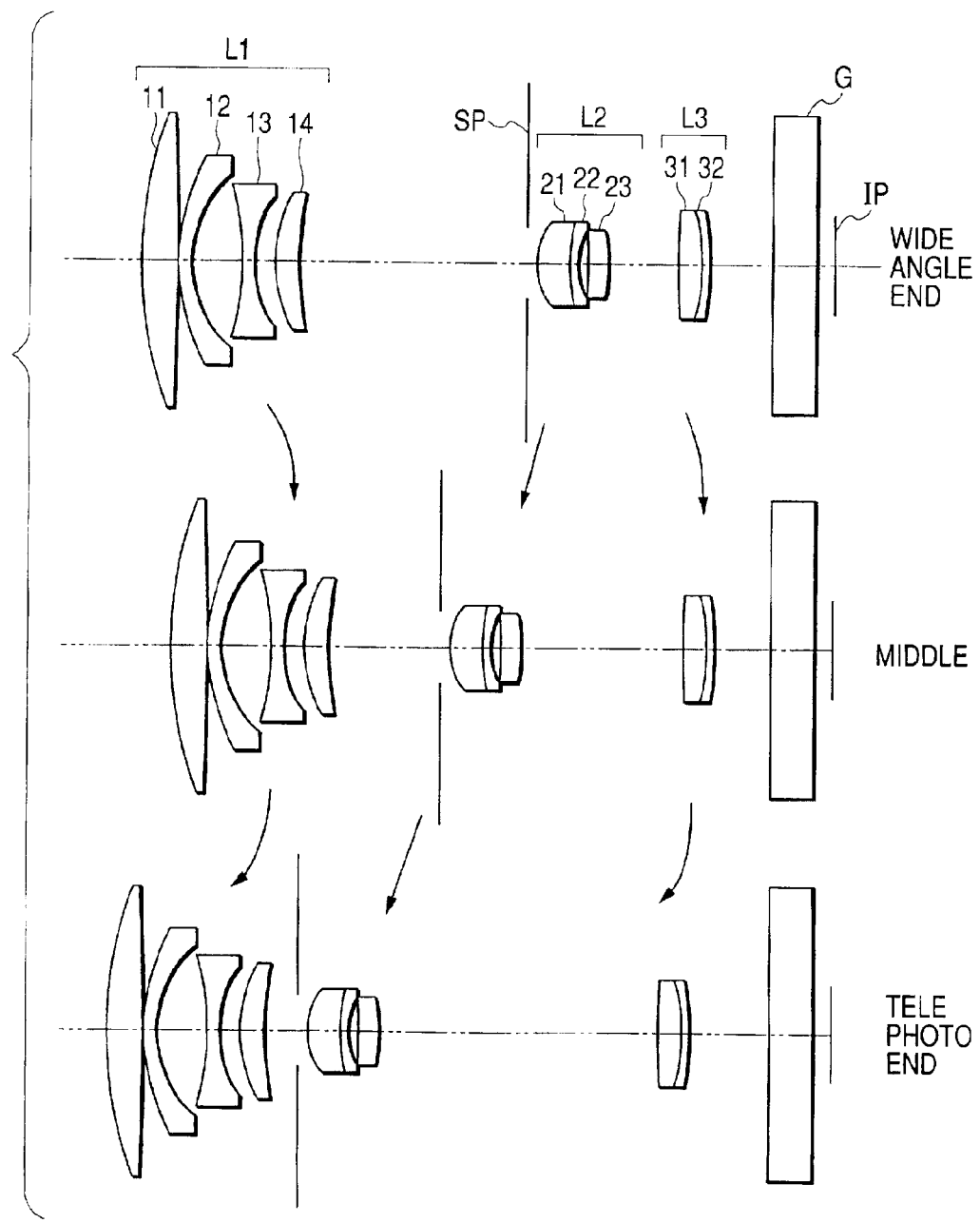
FIG. 9 is a sectional view of a zoom lens according to the third numerical embodiment.
Figure 10:
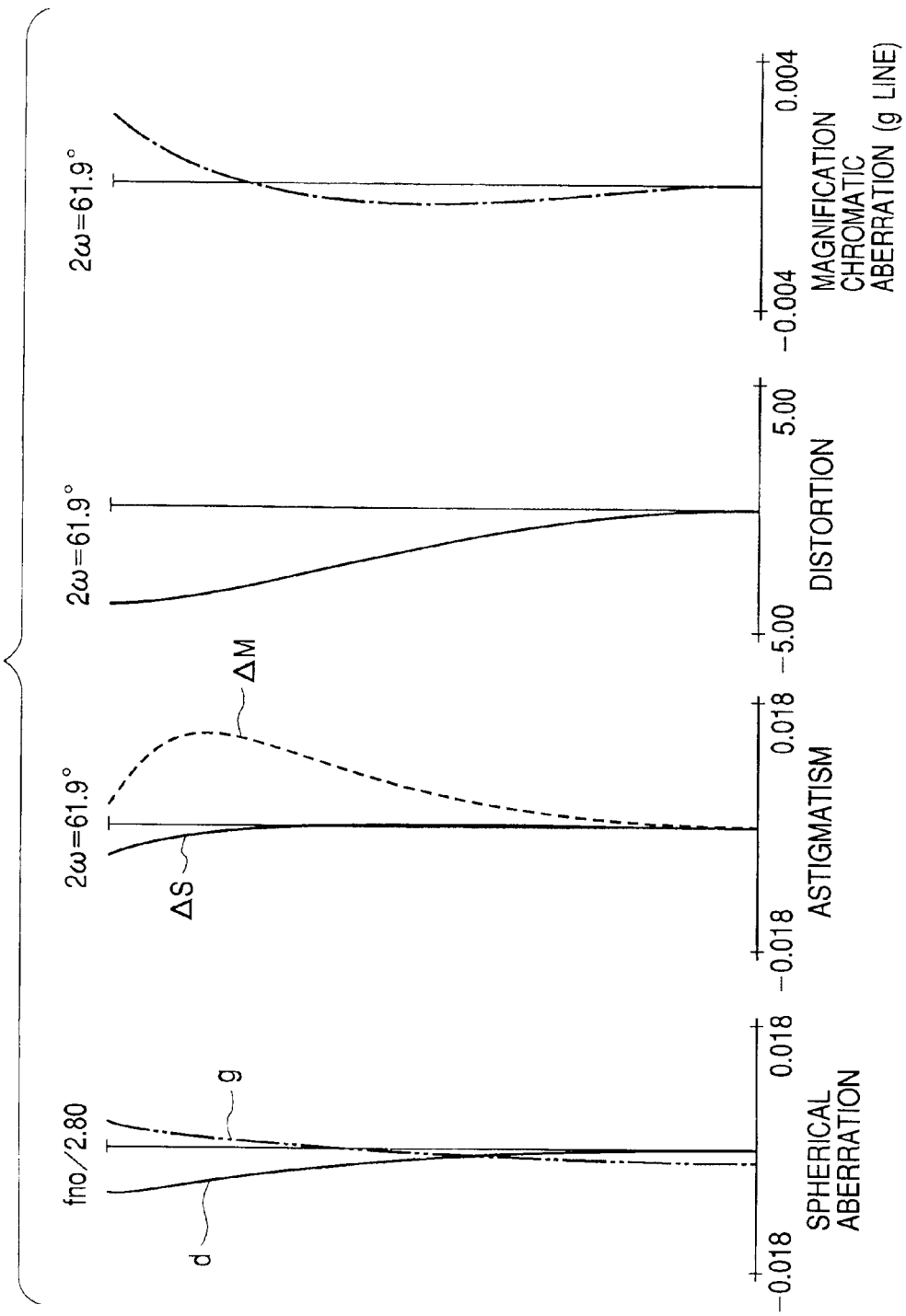
FIG. 10 is an aberration diagram of the zoom lens according to the third numerical embodiment at the wide angle end.
Figure 11:
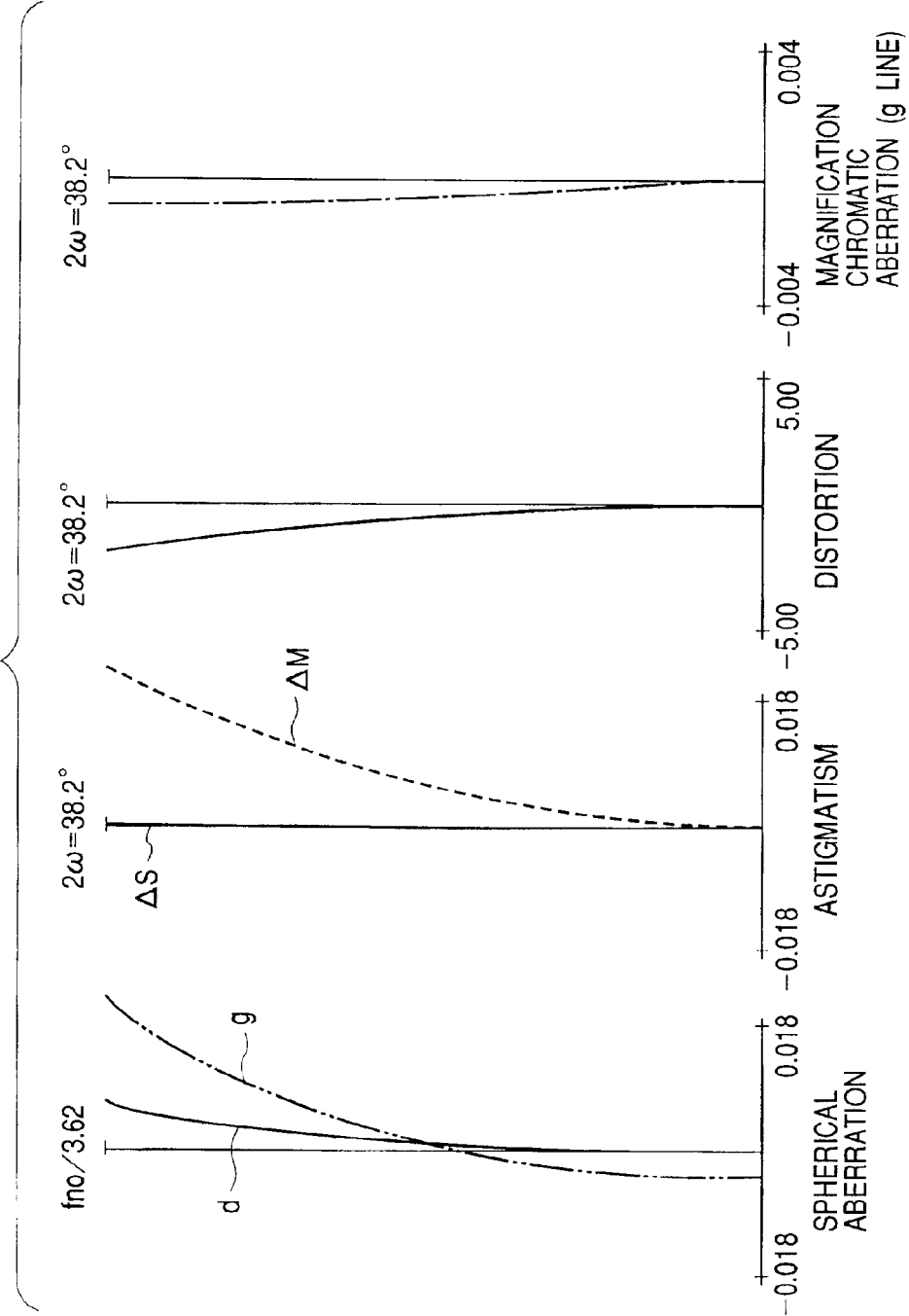
FIG. 11 is an aberration diagram of the zoom lens according to the third numerical embodiment at the middle zoom position.
Figure 12:
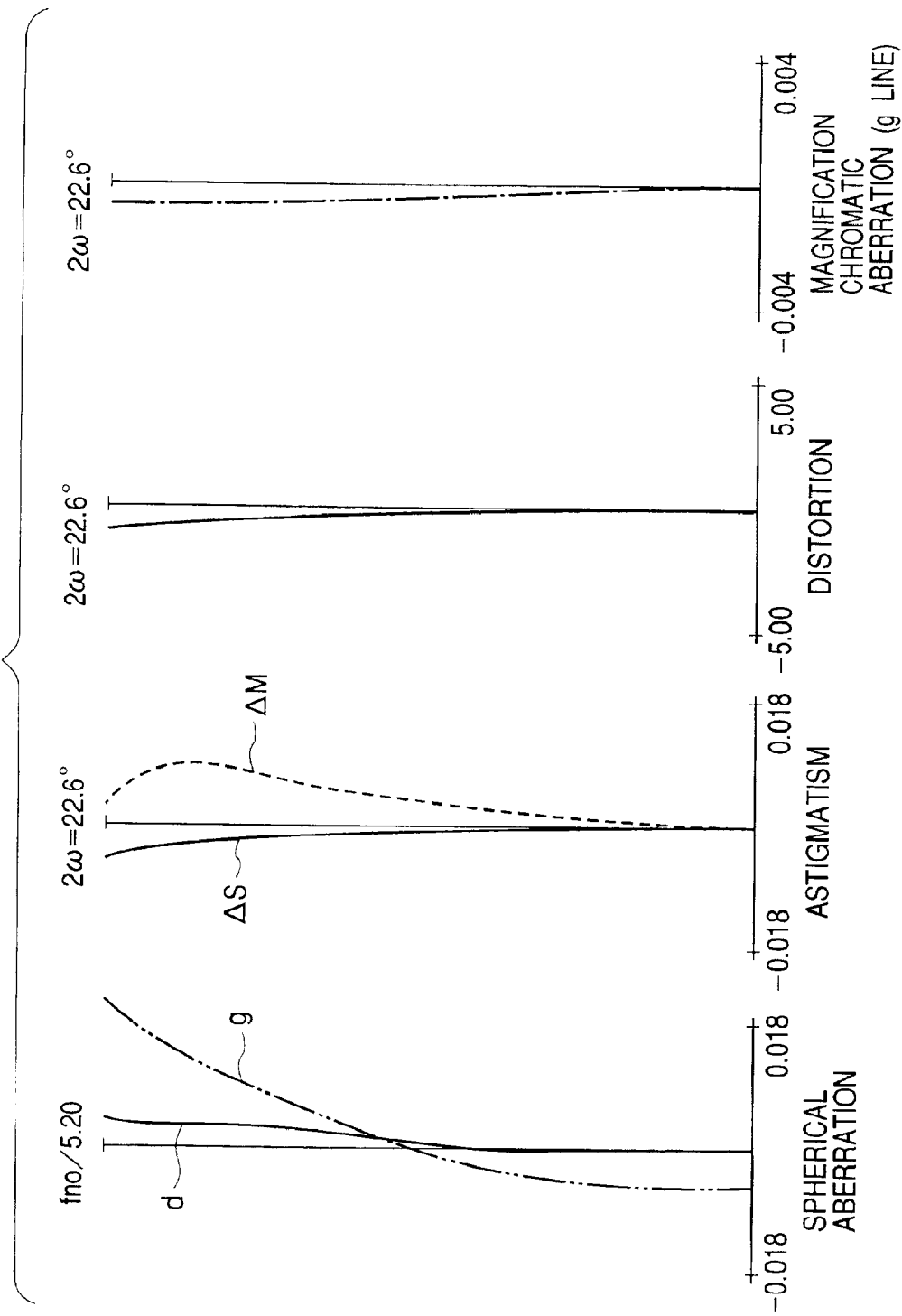
FIG. 12 is an aberration diagram of the zoom lens according to the third numerical embodiment at the telephoto end.

FIG. 9 is a sectional view of the lenses of a zoom lens according to the third numerical embodiment. FIGS. 10 to 12 are aberration diagrams of the zoom lens according to the third numerical embodiment at the wide angle end, middle zoom position, and telephoto end, respectively.

Figure 13:
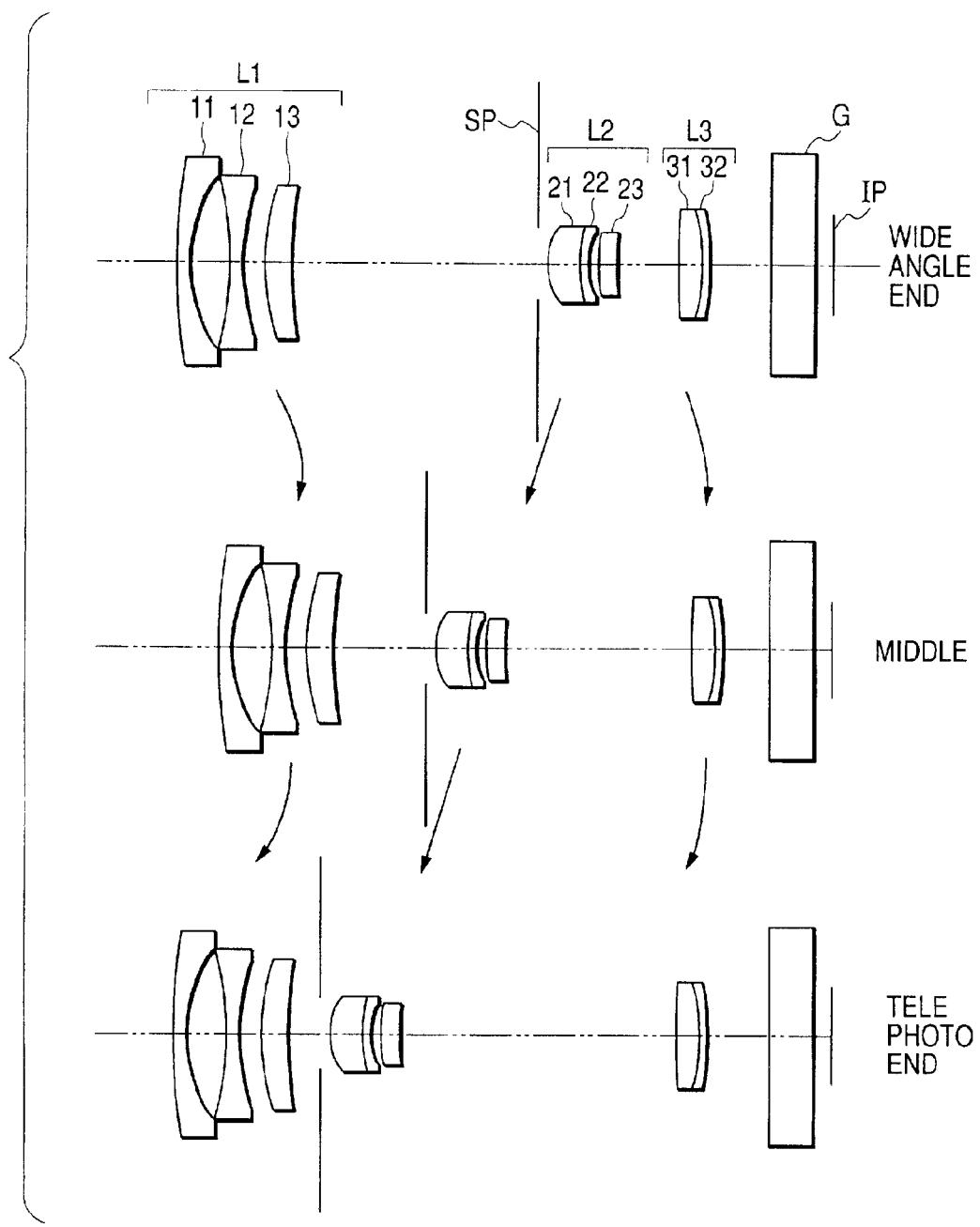
FIG. 13 is a sectional view of a zoom lens according to the fourth numerical embodiment.
Figure 14:
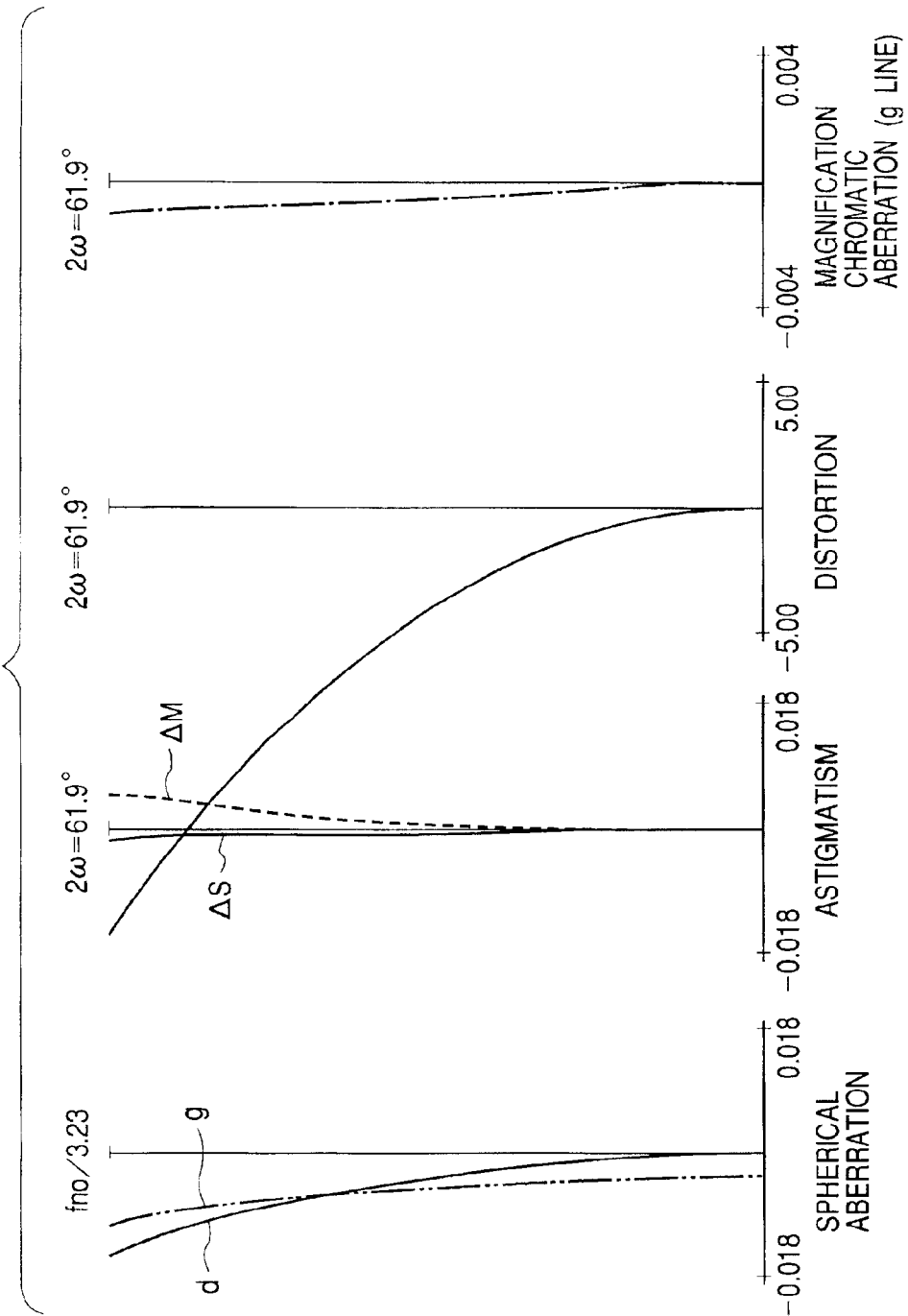
FIG. 14 is an aberration diagram of the zoom lens according to the fourth numerical embodiment at the wide angle end.
Figure 15:
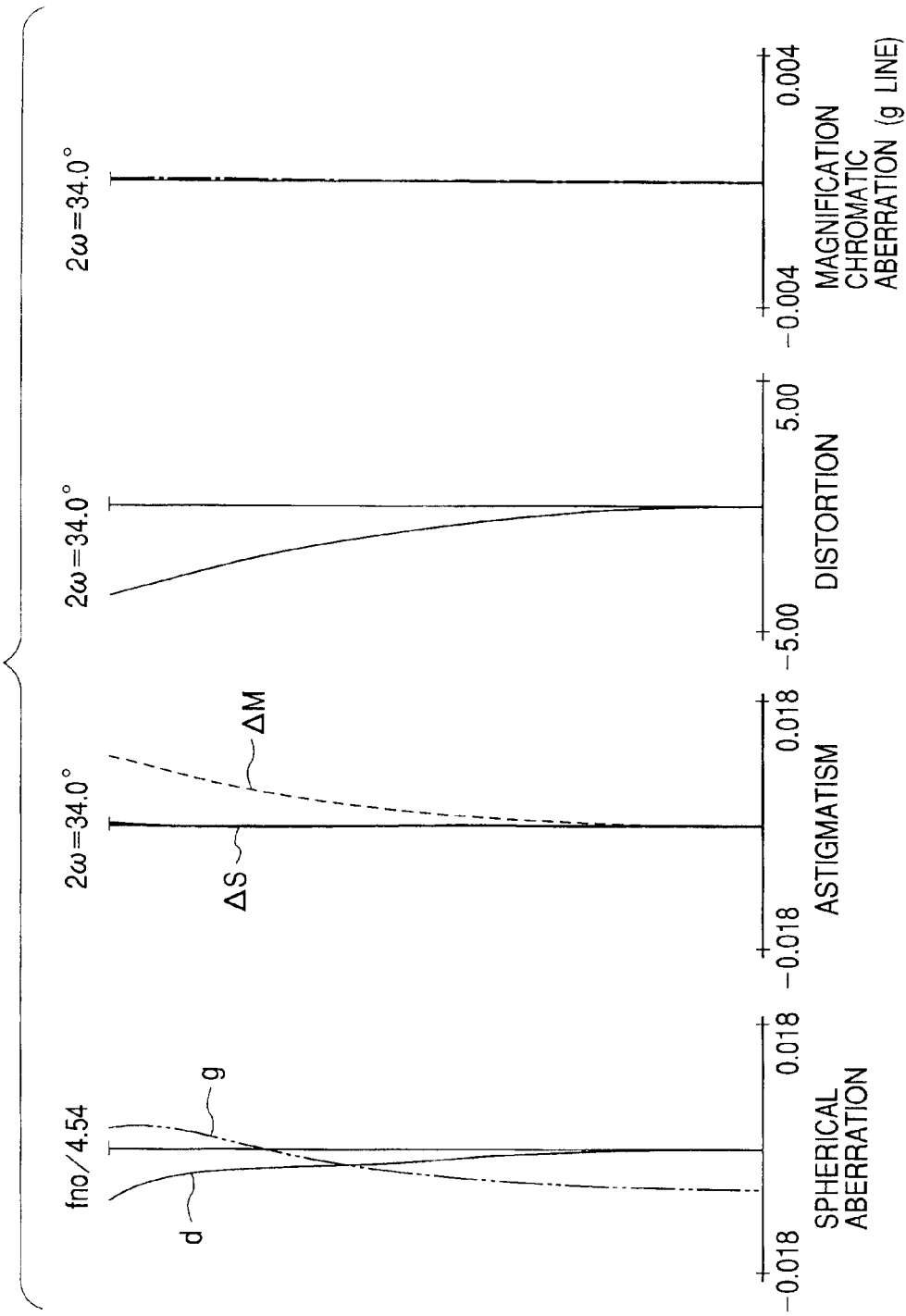
FIG. 15 is an aberration diagram of the zoom lens according to the fourth numerical embodiment at the middle zoom position.
Figure 16:
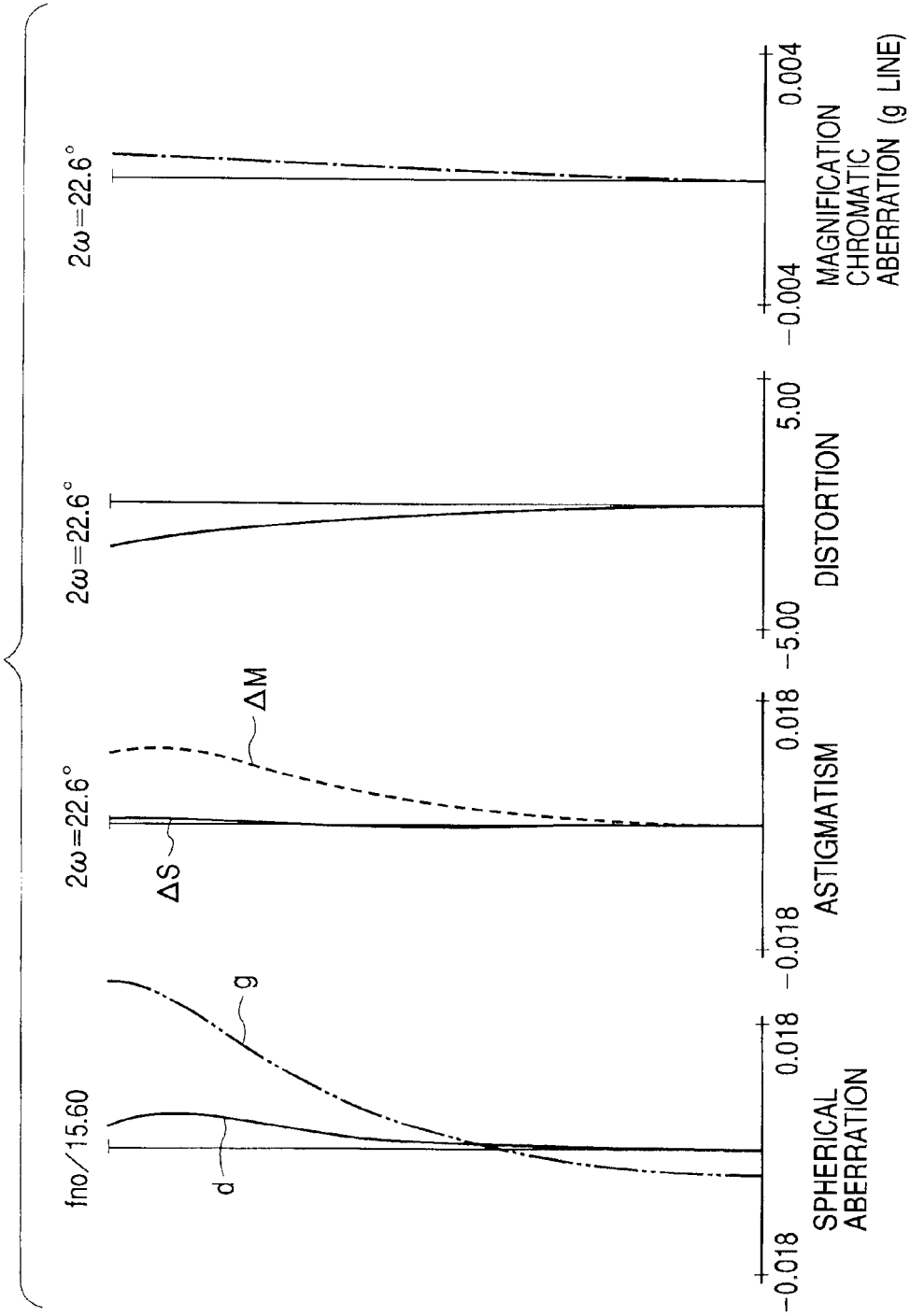
FIG. 16 is an aberration diagram of the zoom lens according to the fourth numerical embodiment at the telephoto end.

FIG. 13 is a sectional view of the lenses of a zoom lens according to the fourth numerical embodiment. FIGS. 14 to 16 are aberration diagrams of the zoom lens according to the fourth numerical embodiment at the wide angle end, middle zoom position, and telephoto end, respectively.

Figure 17:
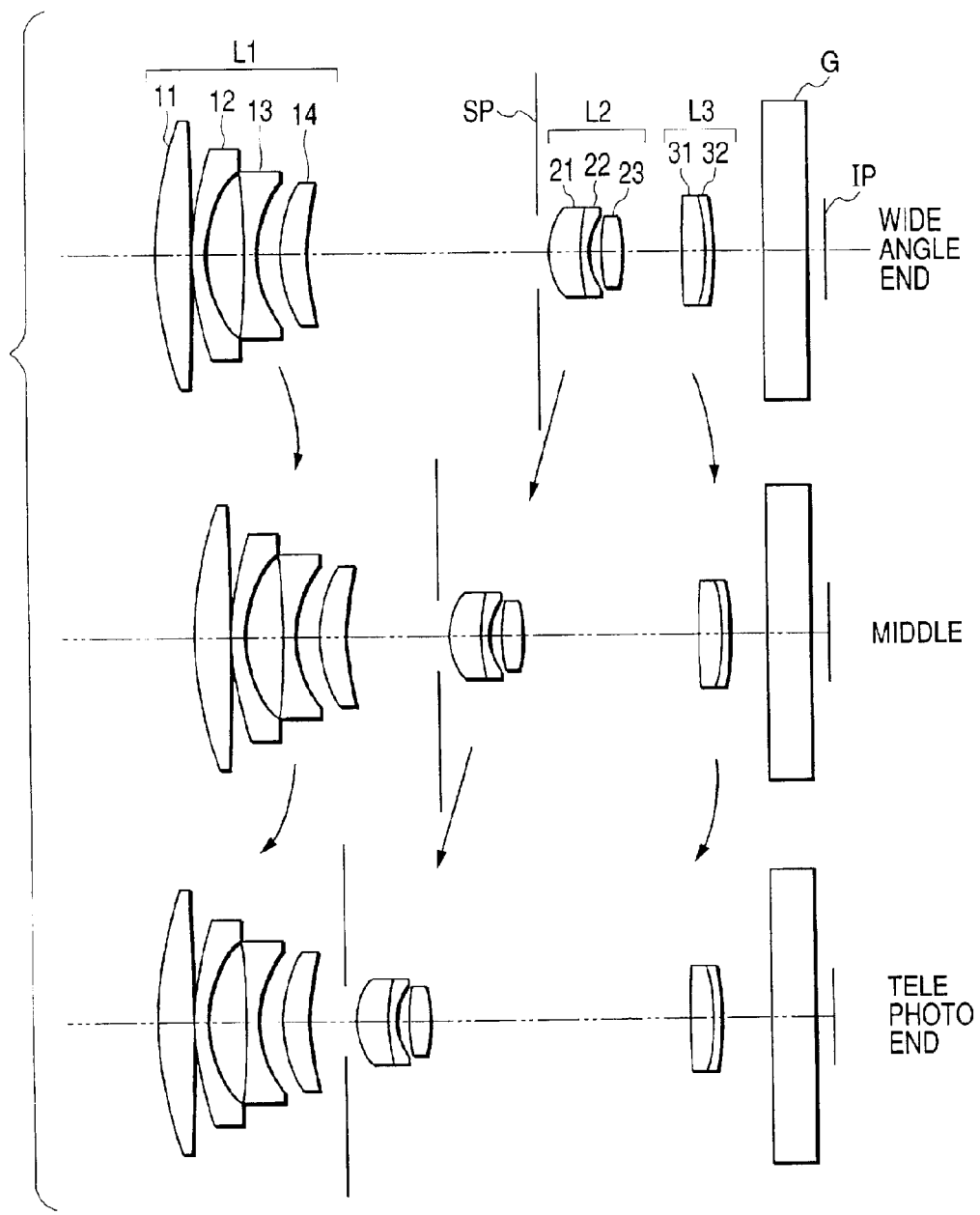
FIG. 17 is a sectional view of a zoom lens according to the fifth numerical embodiment.
Figure 18:
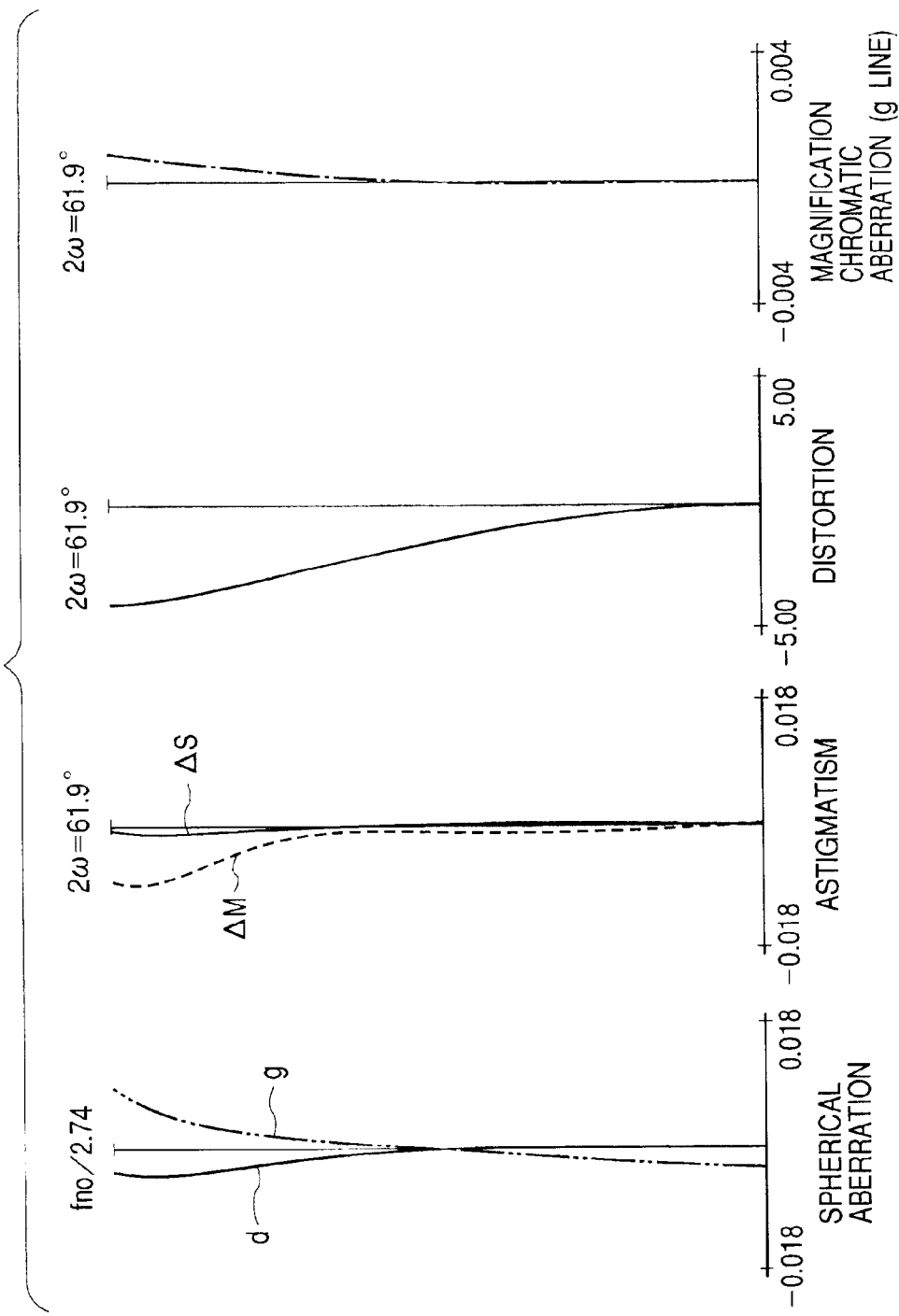
FIG. 18 is an aberration diagram of the zoom lens according to the fifth numerical embodiment at the wide angle end.
Figure 19:
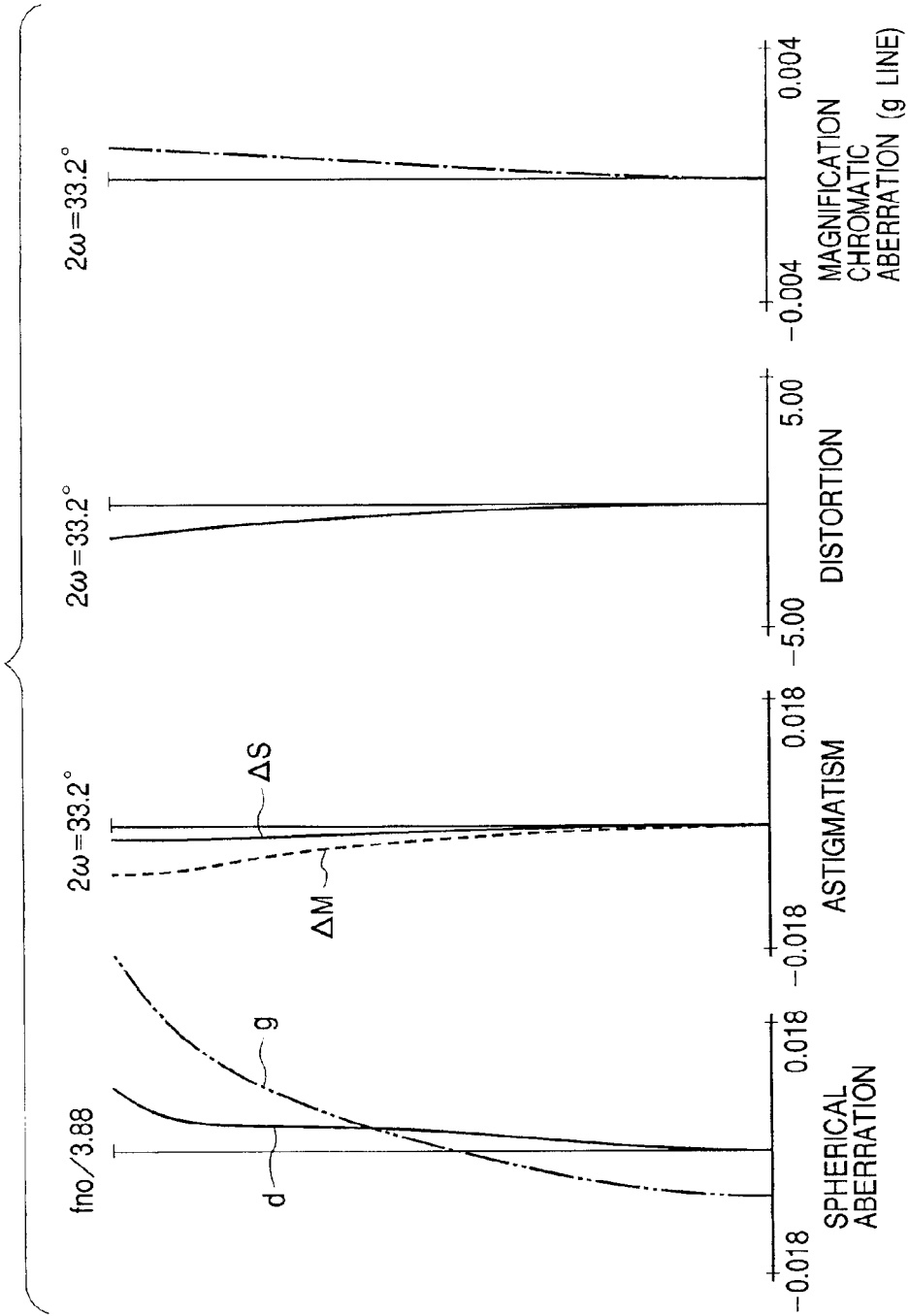
FIG. 19 is an aberration diagram of the zoom lens according to the fifth numerical embodiment at the middle zoom position.
Figure 20:
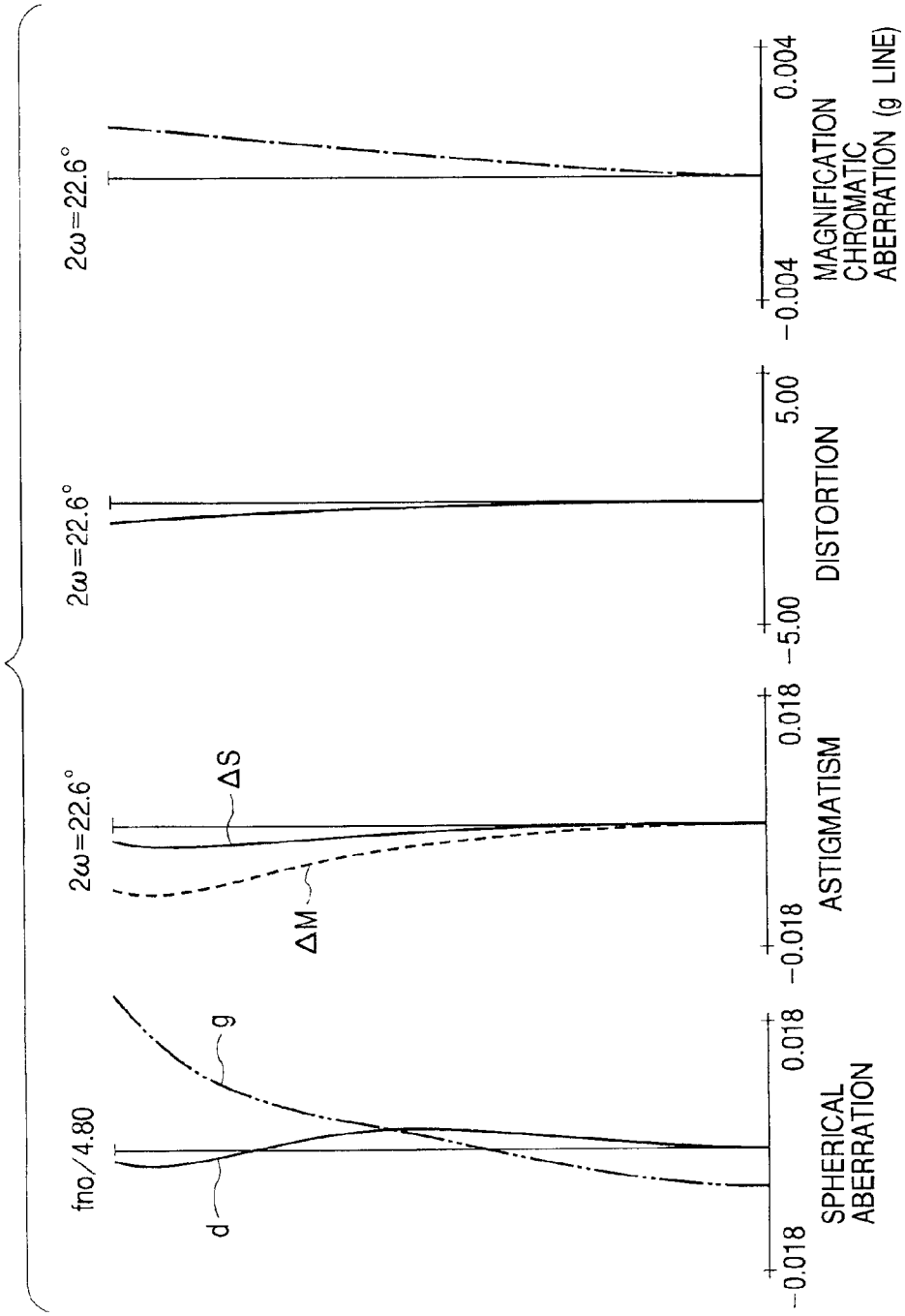
FIG. 20 is an aberration diagram of the zoom lens according to the fifth numerical embodiment at the telephoto end.

FIG. 17 is a sectional view of the lenses of a zoom lens according to the fifth numerical embodiment. FIGS. 18 to 20 are aberration diagrams of the zoom lens according to the fifth numerical embodiment at the wide angle end, middle zoom position, and telephoto end, respectively.

Figure 21:
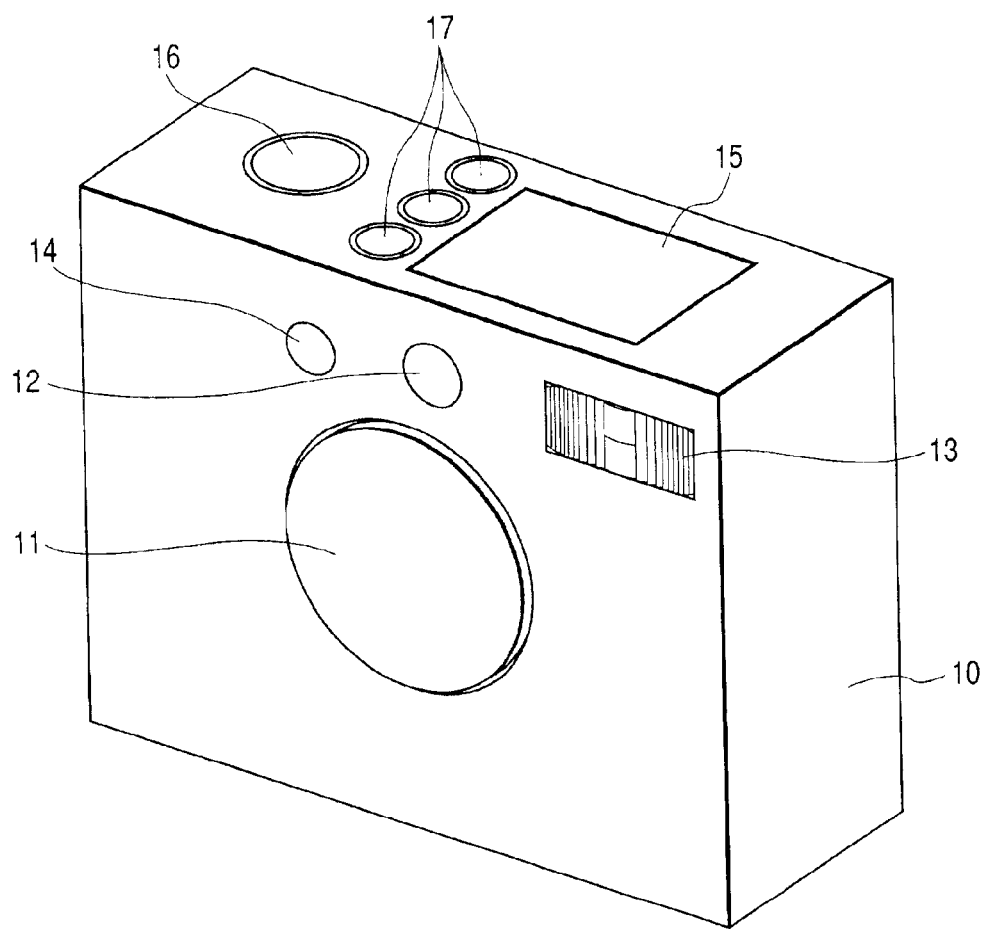
FIG. 21 is a schematic view of the main part of a digital camera.

FIG. 21 is a schematic view showing the main part of a digital still camera using each of the zoom lenses according to the first to fifth numerical embodiments as an image taking.

Referring to the sectional view of the lenses in each numerical embodiment, each zoom lens includes a first unit (first lens unit) L1 having a negative optical power, a second unit (second lens unit) L2 having a positive optical power, a third unit (third lens unit) L3 having a positive optical power, an aperture stop SP, an image plane IP, and a glass block G corresponding to a filter, color separation prism, or the like.

This embodiment has three units, i.e., the first unit having a negative optical power, the second unit having a positive optical power, and the third unit having a positive optical power, which are sequentially arranged from the object side to the image side. In zooming from the wide angle end to the telephoto end, the first unit reciprocates along a convex locus on the image side or performs part of this movement, the second unit moves to the object side, and the third unit moves along a convex locus on the image side or performs part of this movement.

The zoom lens of this embodiment forms a so-called wide angle short zoom system basically using the first unit having a negative optical power and the second unit having a positive optical power. This zoom lens performs magnification variation by moving the second unit having a positive optical power, and corrects the movement of an image point upon zooming by reciprocating the first unit having a negative optical power. The third unit having a positive optical power serves to increase the optical power of an taking lens with miniaturization of the image pickup element so as to reduce the optical power of the short zoom system constituted by the first and second units, thereby suppressing the occurrence of aberration in the lenses of the first unit, in particular, and achieving good optical performance. In addition, telecentric imaging on the image side, which is required for an image taking apparatus using a solid-state image pickup element or the like, in particular, is realized by letting the third unit with a positive optical power serve as a field lens. Furthermore, since the height from the optical axis of an off-axis ray incident on the third unit can be controlled by moving the third unit during zooming, the capability of correcting various off-axis aberrations improves, thus realizing excellent performance throughout the entire zooming range.

Assume that a zoom type is used, in which the space between the first and second units decreases, and the space between the second and third units increases in zooming from the wide angle end to the telephoto end, and the third unit has a cemented lens formed by cementing a positive lens to a negative lens. In this case, letting NLi be the number of constituent lenses of the ith unit, $$NL3 < NL2 \leq NL1 \quad (1)$$

is satisfied.

By forming each lens unit with the number of constituent lenses satisfying conditional expression (1) in this manner, a zoom lens exhibiting little aberration variations and high optical performance throughout the entire zooming range is obtained while the number of constituent lenses of the overall lens system is decreased.

A zoom lens as an object of the present invention can achieve an initial object with the above configuration. However, in order to obtain higher optical performance throughout the entire zooming range and the entire screen, at least one of the following configuration requirements is preferably satisfied.

(A-1) The second unit is preferably comprised of a cemented lens formed by cementing a positive lens to a negative lens and a positive lens in biconvex shape, which are sequentially arranged from the object side to the image side, and the first unit is preferably comprised of three or more lenses including a negative lens in a meniscus shape with a concave surface facing the image side and a positive lens in a meniscus shape with a convex surface facing the object side.

(A-2) The second unit is preferably comprised of a cemented lens formed by cementing a positive lens to a negative lens and a positive lens in biconcave shape, which are sequentially arranged from the object side to the image side, and the first unit preferably include a negative lens in a meniscus shape with a concave surface facing the image side and a positive lens in a meniscus shape with a convex surface facing the object side.

(A-3) The second unit preferably has a cemented lens formed by cementing a positive lens to a negative lens and a positive lens in biconcave shape and satisfies the following conditional expressions:

$$0.7 < Rb/Ra < 1.2 \quad (2)$$

$$-0.6 < (Rd+Rc)/(Rd-Rc) < 0.6 \quad (3)$$

where Ra is the radius of curvature of the lens surface of the cemented lens which is nearest to the object side, Rb is the radius of curvature of the lens surface of the cemented lens which is nearest to the image side, Rc is the radius of curvature of the lens surface of the positive lens in biconcave shape which is located on the object side, and Rd is the radius of curvature of the lens surface of the positive lens which is located on the image side.

(A-4) The lens surface of the second unit which is located nearest to the object side preferably has a convex aspherical shape projecting on the object side and designed to weaken the converging effect from the optical axis to the periphery.

(A-5) The third unit preferably moves along a convex locus to the image side in zooming from the wide angle end to the telephoto end.

(A-6) Letting d be the thickness of the cemented lens of the second unit, and fw be the focal length of the overall system at the wide angle end, it is preferable to satisfy $$0.3 < d/fw < 0.5 \quad (4)$$

(A-7) The second and third units preferably move along the optical axis in zooming, and the second unit preferably has a cemented lens constituted by positive and negative lenses.

(A-8) Letting f3n be the focal length of the negative lens of the cemented lens of the third unit, f3 be the focal length of the third unit, v3n be the Abbe number of the material for the negative lens of the cemented lens of the third unit, and N3n be the refractive index, it is preferable to satisfy $$0.8 < |f3n/f3| < 1.7 \quad (5)$$

$$v3n < 40 \quad (6)$$

$$1.7 < N3n \quad (7)$$

(A-9) The first unit preferably includes a positive lens with a convex surface facing the object side, a negative lens in a meniscus shape with a concave surface facing the image side, a negative lens, and a positive lens in a meniscus shape with a convex surface facing the object side, which are sequentially arranged from the object side to the image side.

(A-10) Letting M1 be the zoom position when the third unit is located nearest to the image side, x3w be the moving distance of the third unit in zooming from the wide angle end to the zoom position M1, and x3t be the moving distance of the third unit in zooming from the zoom position M1 to the telephoto end, it is preferable to satisfy $$0.2 < x3w/x3t < 3.0 \quad (8)$$

(A-11) Letting $\beta 3t$ be the lateral magnification of the third unit at the telephoto end, it is preferable to satisfy $$0.6 < \beta 3t < 0.8 \quad (9)$$

(A-12) Focusing is preferably performed by moving the third unit along the optical axis.

(A-13) The second unit prefereably has a cemented lens formed by cementing a positive lens to a negative lens and a positive lens in a biconvex shape and satisfies the following conditional expressions:

$$0.7 < Rb/Ra < 1.2 \quad (2)$$

$$-0.6 < (Rd+Rc)/(Rd-Rc) < 0.6 \quad (3)$$

$$0.3 < d/fw < 0.5 \quad (4)$$

$$0.8 < |\beta 3n/\beta| < 1.7 \quad (5)$$

$$v3n < 40 \quad (6)$$

$$1.7 < N3n \quad (7)$$

where Ra is the radius of curvature of the lens surface of the cemented lens of the second unit which is nearest to the object side, Rb is the radius of curvature of the lens surface of the second unit which is nearest to the image side, Rc is the radius of curvature of the lens surface of the positive lens in the biconvex shape which is located on the object side, Rd is the radius of curvature of the lens sufarce of the positive lens which is located on the image side, d is the thickness of the cemented lens of the second unit, fw is the focal length of the overall system at the wide angle end, f3n is the focal length of the negative lens of the cemented lens of the third unit, f3 is the focal length of the third unit, v3n is the Abbe number of the material for the negative lens of the third unit, and N3n is the refractive index.

(A-14) Letting M1 be the zoom position when the third unit is located nearest to the image side, x3w be the moving distance of the third unit in zooming from the wide angle end to the zoom position M1, x3t be the moving distance of the third unit in zooming from the zoom position M1 to the telephoto end, and $\beta 3t$ be the lateral magnification of the third unit at the telephoto end, it is preferable to satisfy $$0.2 < x3w/x3t < 3.0 \quad (8)$$

$$0.6 < \beta 3t < 0.8 \quad (9)$$

The characteristics of the optical performance acquired when the zoom lens satisfies configuration requirements (A-1) to (A-14) will be generally described next.

An aperture stop is placed on the object side of the second unit to decrease the distance between the incident pupil and the first unit on the wide angle end side so as to suppress an increase in the effective diameter of each lens of the first unit. In addition, the first and third units located on the two sides of the aperture stop placed on the object side of the second unit having a positive optical power cancel out various off-axis aberrations to obtain good optical performance without increasing the number of constituent lenses.

In each of the first, second, third, and fifth numerical embodiments, the first unit having a negative optical power is comprised of a positive lens 11, a negative lens 12 in a meniscus shape with a concave surface facing the image side, a negative lens 13, and a positive meniscus lens 14 with a convex surface facing the object side, which are sequentially arranged from the object side, the second unit having a positive optical power is comprised of a cemented lens constituted by a positive lens 21 with a convex surface facing the object side and a negative lens 22 with a concave surface facing the image side and a positive lens 23 in a biconcave shape, which are sequentially arranged from the object side to the image side, and the third unit having a positive optical power is formed by a cemented lens constituted by a positive lens 31 and negative lens 32.

In the first unit, barrel distortion that tends to mainly occur at the wide angle end is corrected by the air lens between the positive lens 11 and the negative lens 12. Distortion can be corrected by using an aspherical surface for the first unit. In this case, however, since the lens diameter of the first unit is larger than that of the remaining units, when an aspherical lens is to be manufactured by glass molding, the time necessary for molding the lens becomes undesirably long. This makes it difficult to mold the lens.

Note that the negative lens 12 and positive lens 14 constituting the first unit have almost concentric spherical surfaces centered on the aperture stop center to suppress the occurrence of off-axis aberration caused by refraction of an off-axis principal ray. That is, the negative lens 12 has a meniscus shape with a concave surface facing the image side, and the positive lens 14 has a meniscus shape with a convex surface facing the object side.

As another configuration of the first unit, the configuration in the fourth embodiment shown in FIG. 13 from which the positive lens 11 is omitted may be used. In this case, although the above distortion correcting capability deteriorates, no problems arise when distortion is allowed depending on application purposes.

The second unit is comprised of three lenses. Conventionally, the second unit is formed by a triplet comprised of three lenses, i.e., a positive lens, negative lens, and positive lens. This unit undergoes a great deterioration in performance due to relative decentering of the positive and negative lenses on the object side. This is because the sensitivity of an air lens formed between the two lenses is especially high. According to the present invention, the positive lens 21 and negative lens 22 are cemented to form a cemented lens so as to minimize a deterioration in performance due to manufacturing errors.

Off-axis coma aberration is properly corrected between the negative lens 22 and the positive lens 23.

To properly correct spherical aberration, the object-side lens surface of the positive lens 21 is preferably formed into an aspherical surface shape, with the convex lens surface facing the object side, to weaken the converging effect from the optical axis to the periphery.

Note that the positive lens 23 may be a cemented lens constituted by a negative lens and positive lens. This improves the chromatic aberration correcting capability.

With the above configuration, the second unit obtains good optical performance while realizing a compact structure with a very small number of lenses.

The third unit is formed by a cemented lens constituted by positive and negative lenses and properly corrects magnification chromatic aberration mainly throughout the entire zooming range, in particular. Variations in magnification chromatic aberration during zooming occur in the first unit. If, however, the third unit is formed by a cemented lens, good aberration correction can be done throughout the entire zooming range by selecting a glass material for the first unit in consideration of correction of a variation amount, in particular, and selecting a glass material for the third unit in consideration of correction of an absolute amount, in particular.

If the third unit is formed by one positive lens, a low-dispersion glass material must be selected to suppress the occurrence of magnification chromatic aberration. Since the low-dispersion glass has a relatively low refractive index, the Petzval's sum increases in the positive direction, and curvature of field tends to be under-corrected. For this reason, according to the present invention, the third unit is formed by a cemented lens to allow the use of a glass material having a relatively high refractive index, thereby correcting both magnification chromatic aberration and curvature of field.

According to this embodiment, when focusing on a near object is to be performed, a rear focus scheme of moving the third unit altogether is used. This makes it possible to prevent an increase in front-element diameter due to focusing and realize a lightweight focusing unit by decreasing the minimum image pickup distance.

If the third unit of a three-unit zoom lens constituted by lens units with negative, positive, and positive optical powers is used as a focusing lens, the extension amount tends to increase as approaching the telephoto end. When the third unit is to move toward the object side from the wide angle end to the telephoto end, the third unit requires the sum of the moving amount in zooming and the extension amount at the telephoto end. As a consequence, the moving distance of the third unit increases, and hence a shaft for driving the third unit along the optical axis increases in length. This leads to a disadvantageous effect on the miniaturization of the zoom lens.

When the third unit moves toward the image side from the wide angle end to the telephoto end, the moving range for zooming overlaps the extension range to the object side at the telephoto end. Therefore, the moving stroke of the third unit itself is shortened to produce an advantageous effect on miniaturization. In this case, exit pupil variations increase from the wide angle end to the telephoto end. In general, in a solid-state image pickup element such as a CCD, an improvement in sensitivity is attained by condensing light on the effective portions of pixels as much as possible by using a microlens array. The microlens array is designed to maximize the beam condensing power at a specific exit pupil. Beyond an allowable amount from this exit pupil, luminance shading and color shading become conspicuous. If, therefore, exit pupil variations are extremely large, it is difficult to reduce shading within the allowable amount throughout the entire range. For this reason, the exit pupil variations are preferably reduced. When the aperture stop is moved together with the second unit, the exit pupil changes to the minus side from the wide angle end to the telephoto end. When the third unit moved to the image side, this change increases.

If the third unit is located at the same position on the optical axis at the wide angle end and the telephoto end, both a decrease in moving stroke and a reduction in exit pupil variation can be attained. If the zoom ratio is further increased, it is difficult to cancel various aberrations throughout the entire zooming range by moving the first and second units. In this case, however, an advantageous effect can be produced by moving the third unit nonlinearly.

An example of such a scheme may be a scheme of moving the third unit along a convex locus to the object side, from the wide angle end to the telephoto end or along a convex locus to the image side. A so-called collapsible barrel configuration is known, in which each lens unit is further moved toward the image side beyond the normal moving range when photographing is not performed, thereby decreasing the total lens length. According to such a collapsible barrel configuration, if the third unit is inhibited from moving to the object side as much as possible, the moving stroke from the collapsible barrel end is shortened. This makes it possible to decrease the length of the shaft for driving the third unit, thus producing an advantageous effect on miniaturization.

In addition, if the third unit is moved along a convex locus to the image side, the convex locus along which the locus is made more moderate than when the third unit is moved along a convex locus to the object side. If, therefore, the first unit is to be driven by a mechanism of converting rotational motion into linear motion, since the cam angle decreases, the stress produced upon conversion from rotational motion to linear motion decreases. This allows the use of a motor with a low driving torque.

For the above reasons, the zoom lens of the present invention is designed to move the third unit along a convex locus to the image side from the wide angle end to the telephoto end.

The technical meanings of the conditional expressions given above will be described next.

Conditional expression (2) is an expression for defining the ratio of radius of curvature between the lens surface of the cemented lens of the second unit which is located on the object side and the lens surface located on the image side.

As the radius of curvature Rb extremely increases as compared with the radius of curvature Ra beyond the upper limit, the optical power of the surface with the radius of curvature Rb is weakened. Since the surface with the radius of curvature Rb is a main surface for correcting the Petzval's amount of the second unit, an under-corrected image plane is undesirably produced in the end. If the radius of curvature Rb extremely decreases as compared with the radius of curvature Ra below the lower limit, the incident angle of one marginal ray of an off-axis ray incident on the surface with the radius of curvature Rb becomes small, whereas the incident angle of the other marginal ray becomes large. The ray on the large incident-angle side, in particular, becomes a flare ray, resulting in a deterioration in imaging performance.

Conditional expression (3) is an expression for defining a shape factor for the positive lens of the second unit.

A relatively afocal on-axis ray is incident on the positive lens. If the curvature of the image-side lens surface increases beyond the upper limit to approach that of a planoconvex lens, the ratio of the share of an effect of converging an on-axis ray increases on the image-side surface, resulting in insufficient correction of spherical aberration. In addition, if the curvature of the object-side lens surface increases below the lower limit to approach that of a planoconvex lens, since the incident angle of an off-axis principal ray on the object-side lens surface increases, resulting in occurrence of excessive astigmatism.

If the thickness of the cemented lens increases beyond the upper limit defined by conditional expression (4) as compared with the wide angle end focal length, the size of the second unit undesirably increases in the optical axis direction, thus producing disadvantageous effect on miniaturization. If the thickness decreases below the lower limit, it is difficult to correct both spherical aberration and coma aberration in the cemented lens.

Conditional expression (5) is an expression for defining the optical power of the negative lens of the cemented lens of the third unit. If the optical power decreases beyond the upper limit, magnification chromatic aberration cannot be sufficiently corrected even with a high-dispersion glass material. If the optical power increases below the lower limit, since the curvature of the cemented surface increases, the thickness of the central portion of the positive lens of the cemented lens increases, resulting in an increase in the thickness of the third unit. Therefore, this is not preferable in terms of miniaturization.

Conditional expression (6) is an expression for defining the Abbe number of the material for the negative lens of the cemented lens of the third unit. If the dispersion decreases beyond the upper limit, magnification chromatic aberration cannot be sufficiently corrected.

Conditional expression (7) is an expression for defining the refractive index of the material for the negative lens of the cemented lens of the third unit. If the refractive index decreases below the lower limit, the Petzval's sum increases in the positive direction, resulting in an under-corrected curvature of field.

Conditional expression (8) is an expression for defining the locus of the third unit. Assume that the third unit moves along a convex locus to the image side. In this case, if expression (8) is less than 1, the third unit is located closer to the image side than the wide angle end at the telephoto end. In contrast to this, if expression (8) is 1 or more, the third unit is located closer to the object side than the wide angle end at the telephoto end.

Beyond the upper limit defined by conditional expression (8), the moving stroke is too long, and hence the driving shaft for moving the third unit along the optical axis becomes too long. Therefore, this structure is not suitable for a collapsible barrel configuration. Below the lower limit, the exit pupil variations are large, and shading excessively occurs in the CCD.

Conditional expression (9) is an expression for defining the magnification of the third unit at the telephoto end. The focus sensitivity of the third unit at the telephoto end is given by $$1-\beta 3t^2$$

As β3t increases, the focus sensitivity decreases, and a large moving amount must be ensured for focus adjustment. Beyond the upper limit defined by conditional expression (9), since the focus sensitivity of the third unit greatly deteriorates, the moving range of the third unit must be increased, posing a problem in terms of miniaturization.

Below the lower limit, a backfocus large enough to insert a filter cannot be ensured.

The following are the numerical data of the first to fifth numerical embodiments. In each numerical embodiment, let i be the ordinal number of a surface from the object side, Ri be the radius of curvature of the ith surface, Di be the thickness of an optical member or air space between the ith surface and the (i+1)th surface, and Ni and vi be the refractive index and Abbe number, respectively, with respect to the d line. The two surfaces located nearest to the image side are optical members equivalent to a quartz low-pass filter, infrared cut filter, and the like. In addition, B, C, D, and E are aspherical surface coefficients. Letting x be a displacement in the optical axis direction with reference to a surface vertex at a height H from the optical axis, an aspherical surface shape is expressed by $$x = \frac{(1/R)H^2}{1+\sqrt{1-(1+K)(H/R)^2}} + BH^4 + CH^6 + DH^8 + EH^{10}$$

where R is the radius of curvature and K is the constant of the cone.

In addition, "e−X" means "×10$^{-x}$".

Table 1 shows the relationship between the conditional expressions given above and various numerical values in the respective numerical embodiments.

First Numerical Embodiment

Note that in all the numerical embodiments, the middle position is the position where the third unit is located nearest to the image side.

Lens data are shown below.

| f = 1 to 3.00 | Fno = 2.79 to 4.80 | 2ω = 61.9° to 22.6° | |
|---|---|---|---|
| R1 = 6.069 | D1 = 0.41 | N1 = 1.772499 | v1 = 49.6 |
| R2 = −75.425 | D2 = 0.07 | | |
| R3 = 4.051 | D3 = 0.15 | N2 = 1.712995 | v2 = 53.9 |
| R4 = 1.721 | D4 = 0.49 | | |
| R5 = −5.831 | D5 = 0.15 | N3 = 1.743997 | v3 = 44.8 |
| R6 = 1.548 | D6 = 0.32 | | |
| R7 = 1.892 | D7 = 0.33 | N4 = 1.846660 | v4 = 23.9 |
| R8 = 4.061 | D8 = variable | | |
| R9 = aperture stop | D9 = 0.13 | | |
| R10 = 0.832 | D10 = 0.40 | N5 = 1.743300 | v5 = 49.3 |
| R11 = 2.148 | D11 = 0.09 | N6 = 1.805181 | v6 = 25.4 |
| R12 = 0.758 | D12 = 0.15 | | |
| R13 = 3.359 | D13 = 0.25 | N7 = 1.772499 | v7 = 49.6 |
| R14 = −3.390 | D14 = variable | | |
| R15 = 13.442 | D15 = 0.30 | N8 = 1.772499 | v8 = 49.6 |
| R16 = −2.616 | D16 = 0.09 | N9 = 1.846660 | v9 = 23.9 |
| R17 = −4.542 | D17 = variable | | |
| R18 = ∞ | D18 = 0.55 | N10 = 1.516330 | v10 = 64.1 |
| R19 = ∞ | | | |

| | Focal Length | | |
|---|---|---|---|
| Variable Range | 1.00 | 1.97 | 3.00 |
| D8 | 3.09 | 1.23 | 0.43 |
| D14 | 0.72 | 2.16 | 3.25 |
| D17 | 0.73 | 0.54 | 0.71 |

| Aspherical Coefficient | | |
|---|---|---|
| R10 | k = 1.83870e−01 | B = −1.23425e−01 | C = −1.41170e−01 |
| | D = −1.16649e−01 | E = −5.80479e−01 | |

| Second Numerical Embodiment | | | |
|---|---|---|---|
| f = 1 to 3.00 | Fno = 2.77 to 4.90 | 2ω = 52.4° to 18.6° | |
| R1 = 4.174 | D1 = 0.34 | N1 = 1.696797 | v1 = 55.5 |
| R2 = −27.819 | D2 = 0.03 | | |
| R3 = 2.440 | D3 = 0.12 | N2 = 1.712995 | v2 = 53.9 |
| R4 = 1.450 | D4 = 0.41 | | |
| R5 = −3.954 | D5 = 0.12 | N3 = 1.743997 | v3 = 44.8 |
| R6 = 1.198 | D6 = 0.22 | | |
| R7 = 1.390 | D7 = 0.27 | N4 = 1.846660 | v4 = 23.9 |
| R8 = 2.677 | D8 = variable | | |
| R9 = aperture stop | D9 = 0.10 | | |
| R10 = 0.690 | D10 = 0.31 | N5 = 1.743300 | v5 = 49.3 |
| R11 = 1.620 | D11 = 0.07 | N6 = 1.805181 | v6 = 25.4 |

-continued

| | | | |
|---|---|---|---|
| R12 = 0.634 | D12 = 0.12 | | |
| R13 = 2.777 | D13 = 0.21 | N7 = 1.772499 | ν7 = 49.6 |
| R14 = −3.050 | D14 = variable | | |
| R15 = 8.577 | D15 = 0.07 | N8 = 1.761821 | ν8 = 26.5 |
| R16 = 2.619 | D16 = 0.25 | N9 = 1.719995 | ν9 = 50.2 |
| R17 = −4.376 | D17 = variable | | |
| R18 = ∞ | D18 = 0.45 | N10 = 1.516330 | ν10 = 64.1 |
| R19 = ∞ | | | |

| | Focal Length | | |
|---|---|---|---|
| Variable Range | 1.00 | 2.17 | 3.00 |
| D8 | 2.48 | 0.85 | 0.37 |
| D14 | 0.64 | 2.19 | 2.99 |
| D17 | 0.67 | 0.44 | 0.53 |

| Aspherical Coefficient | | | |
|---|---|---|---|
| R10 | k = 1.37419e−01 | B = −1.93961e−01 | C = −3.35111e−01 |
| | D = −1.88952e−01 | E = −3.10932e+00 | |

Third Numerical Embodiment
f = 1 to 3.00    Fno = 2.80 to 5.20    2ω = 61.9° to 22.6°

| | | | |
|---|---|---|---|
| R1 = 5.629 | D1 = 0.44 | N1 = 1.772499 | ν1 = 49.6 |
| R2 = −69.260 | D2 = 0.04 | | |
| R3 = 3.085 | D3 = 0.15 | N2 = 1.712995 | ν2 = 53.9 |
| R4 = 1.526 | D4 = 0.62 | | |
| R5 = −3.760 | D5 = 0.15 | N3 = 1.785896 | ν3 = 44.2 |
| R6 = 1.563 | D6 = 0.27 | | |
| R7 = 1.855 | D7 = 0.29 | N4 = 1.846660 | ν4 = 23.9 |
| R8 = 4.519 | D8 = variable | | |
| R9 = aperture stop | D9 = 0.13 | | |
| R10 = 0.835 | D10 = 0.40 | N5 = 1.583126 | ν5 = 59.4 |
| R11 = 2.191 | D11 = 0.09 | N6 = 1.761821 | ν6 = 26.5 |
| R12 = 0.909 | D12 = 0.13 | | |
| R13 = 6.364 | D13 = 0.25 | N7 = 1.712995 | ν7 = 53.9 |
| R14 = −2.070 | D14 = variable | | |
| R15 = 19.250 | D15 = 0.30 | N8 = 1.772499 | ν8 = 49.6 |
| R16 = −2.573 | D16 = 0.09 | N9 = 1.846660 | ν9 = 23.9 |
| R17 = −4.634 | D17 = variable | | |
| R18 = ∞ | D18 = 0.55 | N10 = 1.516330 | ν10 = 64.1 |
| R19 = ∞ | | | |

| | Focal Length | | |
|---|---|---|---|
| Variable Range | 1.00 | 1.71 | 3.00 |
| D8 | 2.86 | 1.43 | 0.41 |
| D14 | 0.87 | 1.98 | 3.48 |
| D17 | 0.81 | 0.71 | 1.00 |

| Aspherical Coefficient | | | |
|---|---|---|---|
| R10 | k = 1.61455e−01 | B = −1.62311e−01 | C = −1.79179e−01 |
| | D = 4.87115e−02 | E = −8.62775e−01 | |

Fourth Numerical Embodiment
f = 1 to 3.00    Fno = 3.23 to 5.60    2ω = 61.9° to 22.6°

| | | | |
|---|---|---|---|
| R1 = 11.353 | D1 = 0.15 | N1 = 1.487490 | ν1 = 70.2 |
| R2 = 1.953 | D2 = 0.49 | | |
| R3 = −3.809 | D3 = 0.15 | N2 = 1.516330 | ν2 = 64.1 |
| R4 = 2.862 | D4 = 0.28 | | |
| R5 = 2.969 | D5 = 0.33 | N3 = 1.846660 | ν3 = 23.9 |
| R6 = 5.113 | D6 = variable | | |
| R7 = aperture stop | D7 = 0.13 | | |

-continued

| | | | |
|---|---|---|---|
| R8 = 0.855 | D8 = 0.40 | N4 = 1.743300 | ν4 = 49.3 |
| R9 = 1.879 | D9 = 0.09 | N5 = 1.805181 | ν5 = 25.4 |
| R10 = 0.772 | D10 = 0.14 | | |
| R11 = 2.655 | D11 = 0.25 | N6 = 1.772499 | ν6 = 49.6 |
| R12 = −4.791 | D12 = variable | | |
| R13 = 15.428 | D13 = 0.30 | N7 = 1.696797 | ν7 = 55.5 |
| R14 = −2.134 | D14 = 0.09 | N9 = 1.805181 | ν8 = 25.4 |
| R15 = −3.823 | D15 = variable | | |
| R16 = ∞ | D16 = 0.55 | N9 = 1.516330 | ν9 = 64.1 |
| R17 = ∞ | | | |

| | Focal Length | | |
|---|---|---|---|
| Variable Range | 1.00 | 1.98 | 3.00 |
| D6 | 3.06 | 1.19 | 0.40 |
| D12 | 0.74 | 2.25 | 3.40 |
| D15 | 0.80 | 0.61 | 0.78 |

| Aspherical Coefficient | | | |
|---|---|---|---|
| R8 | k = 1.71792e−01 | B = −1.03820e−01 | C = −1.10914e−01 |
| | D = −1.70712e−01 | E = −1.19265e−01 | |

Fifth Numerical Embodiment
f = 1 to 3.00    Fno = 2.74 to 4.80    2ω = 61.9° to 22.6°

| | | | |
|---|---|---|---|
| R 1 = 4.930 | D 1 = 0.44 | N 1 = 1.603112 | ν 1 = 60.6 |
| R 2 = −52.251 | D 2 = 0.04 | | |
| R 3 = 4.310 | D 3 = 0.15 | N 2 = 1.712995 | ν 2 = 53.9 |
| R 4 = 1.641 | D 4 = 0.50 | | |
| R 5 = −7.359 | D 5 = 0.15 | N 3 = 1.743997 | ν 3 = 44.8 |
| R 6 = 1.494 | D 6 = 0.31 | | |
| R 7 = 1.793 | D 7 = 0.33 | N 4 = 1.846660 | ν 4 = 23.9 |
| R 8 = 3.652 | D 8 = variable | | |
| R 9 = aperture stop | D 9 = 0.13 | | |
| R10 = 0.792 | D10 = 0.40 | N 5 = 1.806100 | ν 5 = 40.7 |
| R11 = 2.392 | D11 = 0.09 | N 6 = 1.846660 | ν 6 = 23.9 |
| R12 = 0.673 | D12 = 0.16 | | |
| R13 = 2.182 | D13 = 0.25 | N 7 = 1.804000 | ν 7 = 46.6 |
| R14 = −5.890 | D14 = variable | | |
| R15 = 14.950 | D15 = 0.30 | N 8 = 1.772499 | ν 8 = 49.6 |
| R16 = −2.034 | D16 = 0.09 | N 9 = 1.846660 | ν 9 = 23.9 |
| R17 = −4.270 | D17 = variable | | |
| R18 = ∞ | D18 = 0.55 | N10 = 1.516330 | ν10 = 64.1 |
| R19 = ∞ | | | |

| | Focal Length | | |
|---|---|---|---|
| Variable Range | 1.00 | 1.99 | 3.00 |
| D 8 | 2.88 | 1.16 | 0.44 |
| D14 | 0.76 | 2.18 | 3.26 |
| D17 | 0.63 | 0.45 | 0.61 |

Aspherical Coefficient

| | | | |
|---|---|---|---|
| R10 | k = 1.19329e−01 | B = −1.10868e−01 | C = −1.53042e−01 |
| | D = 1.64718e−02 | E = −9.83342e−01 | |

TABLE 1

| | Numerical Embodiment | | | | |
|---|---|---|---|---|---|
| | 1 | 2 | 3 | 4 | 5 |
| Conditional Expression (2) | 0.91 | 0.92 | 1.09 | 0.90 | 0.85 |
| Conditional Expression (3) | 0.01 | 0.05 | −0.51 | 0.29 | 0.46 |

TABLE 1-continued

| | | | | | |
|---|---|---|---|---|---|
| Conditional Expression (4) | 0.49 | 0.39 | 0.49 | 0.49 | 0.49 |
| Conditional Expression (5) | 1.59 | 1.17 | 1.35 | 1.25 | 0.99 |
| Conditional Expression (6) | 23.9 | 26.5 | 23.9 | 25.4 | 23.9 |
| Conditional Expression (7) | 1.847 | 1.762 | 1.847 | 1.805 | 1.847 |
| Conditional Expression (8) | 0.90 | 0.36 | 2.78 | 0.90 | 0.90 |
| Conditional Expression (9) | 0.71 | 0.75 | 0.69 | 0.72 | 0.74 |

An embodiment of a digital still camera (image taking apparatus) using the zoom lens of the present invention as an image taking optical system will be described next with reference to FIG. 21.

Referring to FIG. 21, this embodiment includes a camera main body 10, an image taking optical system 11 formed by the zoom lens of the present invention, and a finder 12 for observing an object image.

The image taking optical system 11 forms an object image on a solid-state image pickup element such as a CCD or CMOS through an optical low-pass filter or infrared cut filter.

This embodiment also includes an electronic flash device 13, a measurement window 14, a liquid crystal display window 15 for informing the operation of the camera, a release button 16, and a scanning switch 17 for switching various modes.

By applying the zoom lens of the present invention to an optical device such as a digital camera, a compact optical device with high optical performance is realized.

According to the embodiment described above, a compact zoom lens having excellent optical performance with a small number of constituent lenses can be realized.

In addition, a three-unit zoom lens constituted by lens units having negative, positive, and positive optical powers can be realized, which is low in manufacturing sensitivity, has attained a reduction in cost, has small exit pupil variations in zooming, and exhibits good optical performance throughout the entire zooming range, including performance associated with magnification chromatic aberration.

Furthermore, a zoom lens can be realized, in which the number of constituent lenses of the second unit is decreased, and the aberration share of each lens unit that moves in zooming is reduced to suppress a deterioration in performance due to relative decentering of the lens units or the like caused by a manufacturing error and facilitate manufacturing. In addition, by optimizing the maved locus of the third unit in zooming to ensure good imaging performance at the middle zoom position to attain good performance throughout the entire zooming range. Furthermore, the exit pupil is sufficiently spaced apart from the image plane, and the moving distance of the first unit upon zooming is decreased, thereby realizing a configuration suitable for a mechanical cam.

What is claimed is:

1. A zoom lens comprising, in order from an object side to an image side:

a first lens unit of a negative optical power, said first lens unit being a lens unit disposed at a position closest to the object side in the zoom lens;

a second lens unit of a positive optical power, said second lens unit being a lens unit disposed at a position following the first lens unit in order from the object side, said second lens unit having an aspherical lens element; and a third lens unit of a positive optical power, said third lens unit being a lens unit disposed at a position following the second lens unit in order from the object side, said third lens unit having a cemented lens formed by cementing a positive lens element to a negative lens element and moving along an optical axis for zooming, wherein a space between said first and second lens units decreases, and a space between said second lens unit and said third lens unit increases in zooming from a wide angle end to a telephoto end, and letting NLi be the number of lens elements constituting an ith lens it, a condition defined by $$NL3 < NL2 \leq NL1$$

is satisfied.

2. A zoom lens according to claim 1, wherein said first lens unit has, in order from the object side to the image side, a negative lens element in a meniscus shape with a concave surface facing the image side and a positive lens element in a meniscus shape with a convex surface facing the object side, and has not less than three lens elements, and said second lens unit consists of, in order from the object side to the image side, a cemented lens formed by cementing a positive lens element to a negative lens element and a positive lens element in a biconvex shape.

3. A zoom lens according to claim 2, wherein letting d be a thickness of the cemented lens of said second lens unit on the optical axis, and fw be a focal length of an overall system at a wide angle end, a conditional expression, $$0.3 < d/fw < 0.5$$

is satisfied.

4. A zoom lens according to claim 1, wherein said first lens unit has, in order from the object side to the image side, a negative lens element in a meniscus shape with a concave surface facing the image side and a positive lens element in a meniscus shape with a convex surface facing the object side, and said second lens unit consists of, in order from the object side to the image side, a cemented lens formed by cementing a positive lens element to a negative lens element and a positive lens element in a biconvex shape.

5. A zoom lens according to claim 4, wherein letting d be a thickness of the cemented lens of said second lens unit on the optical axis, and fw be a focal length of an overall system at a wide angle end, a conditional expression, $$0.3 < d/fw < 0.5$$

is satisfied.

6. A zoom lens according to claim 1, wherein said second lens unit has, in order from the object side to the image side, a cemented lens formed by cementing a positive lens element to a negative lens element and a positive lens element with biconvex surfaces, and letting Ra be a radius of curvature of a lens surface of the cemented lens of said second lens unit which is located nearest to the object side, Rb be a radius of curvature of a lens surface of the cemented lens of said second lens unit which is nearest to an image side, Rc be a radius of curvature of a lens surface of said biconvex positive lens element which is located on the object side, and Rd be a radius of curvature of a lens surface of said biconvex positive lens element which is located on the image side, conditional expressions, $$0.7<Rb/Ra<1.2$$

$$-0.6<(Rd+Rc)/(Rd-Rc)<0.6$$

are satisfied.

7. A zoom lens according to claim 6, wherein letting d be a thickness of the cemented lens of said second lens unit on the optical axis, and fw be a focal length of an overall system at a wide angle end, a conditional expression, $$0.3<d/fw<0.5$$

is satisfied.

8. A zoom lens according to claim 1, wherein a lens surface of said second lens unit which is located nearest to the object side has a convex shape on the object side and has aspherical shape which is designed to weaken a converging effect from the optical axis to a periphery.

9. A zoom lens according to claim 1, wherein said second and third lens units move along the optical axis for zooming, and said second lens unit has a cemented lens formed by cementing a positive lens element to a negative lens element.

10. A zoom lens according to claim 1, wherein letting f3n be a focal length of the negative lens element of the cemented lens of said third lens unit, f3 be a focal length of said third lens unit, v3n be an Abbe number of the negative lens element of the cemented lens of said third lens unit, and N3n be a refractive index of the negative lens element of the cemented lens of said third lens unit, conditional expressions, $$0.8<|f3n/f3|<1.7$$

$$v3n<40$$

$$1.7<N3n$$

are satisfied.

11. A zoom lens according to claim 1, wherein said first lens unit has, in order from the object side to the image side, a positive lens element with a convex surface facing the object side, a negative lens element in a meniscus shape with a concave surface facing an image side, a negative lens element, and a positive lens element in a meniscus shape with a convex surface facing the object side.

12. A zoom lens according to claim 1, wherein letting M1 be a zoom position where said third lens unit is located nearest to the image side in an entire zooming range, x3w be a moving distance of said third lens unit in zooming from the wide angle end to the zoom position M1, and x3t be a moving distance of said third lens unit in zooming from the zoom position M1 to the telephoto end, a conditional expression, $$0.2<x3w/x3t<3.0$$

is satisfied.

13. A zoom lens according to claim 1, wherein letting β3t be a lateral magnification of said third lens unit at the telephoto end, a conditional expression, $$0.6<β3t<0.8$$

is satisfied.

14. A zoom lens according to claim 1, wherein said third lens unit moves along the optical axis for focusing.

15. A zoom according to claim 1, wherein said second lens unit has, in order from the object side to the image side a cemented lens formed by cementing a positive lens element to a negative lens element and a positive lens element in a biconvex shape surfaces, and letting Ra be a radius of curvature of a lens surface of the cemented lens of said second lens unit which is located nearest to the object side, Rb be a radius of curvature of a lens surface of the cemented lens of said second lens unit which is located nearest to an image side, Rc be a radius of curvature of a lens surface of said positive lens element in a biconvex shape which is located on the object side, Rd be a radius of curvature of a lens surface of said positive lens element in the biconvex shape which is located on the image side, d be a thickness of the cemented lens of said second lens unit on the optical axis, fw be a focal length of an overall system at a wide angel end, f3n be a focal length of the negative lens element of the cemented lens of said third lens unit, f3 be a focal length of said third lens unit, v3n be an Abbe number of the negative lens element of the cemented lens of said third lens unit, and N3n be a refractive index, conditional expressions, $$0.7<Rb/Ra<1.2$$

$$-0.6<(Rd+Rc)/(Rd-Rc)<0.6$$

$$0.3<d/fw<0.5$$

$$0.8<|f3n/f3|<1.7$$

$$v3n<40$$

$$1.7<N3n$$

are satisfied.

16. A zoom lens according to claim 15, wherein letting M1 be a zoom position where said third lens unit is located nearest to the image side in an entire zooming range, x3w be a moving distance of said third lens unit in zooming from the wide angle end to the zoom position M1, x3t be a moving distance of said third lens unit in zooming from the zoom position M1 to the telephoto end, and P3t be a lateral magnification of said third lens unit at the telephoto end, conditional expressions, $$0.2<x3w/x3t<3.0$$

$$0.6<β3t<0.8$$

are satisfied.

17. A zoom lens according to claim 1, wherein said zoom lens forms an image on a photoelectric conversion element.

18. An image taking apparatus comprising an image taking lens for forming an image of an object on a photosensitive surface, said image taking lens comprising said zoom lens defined in claim 1.

19. An image taking apparatus comprising:

a photoelectric conversion element; and an image taking lens for forming an image of an object on a photosensitive surface, said image taking lens comprising said zoom lens defined in claim 1.

20. A zoom lens comprising, in order from an object side to an image side:

a first lens unit of a negative optical power;

a second lens unit of a positive optical power; and a third lens unit of a positive optical power, said third lens unit having a cemented lens formed by cementing a positive lens element to a negative lens element and moving along an optical axis for zooming, wherein a space between said first and second lens units decreases, and a space between said second lens unit and said third lens unit increases in zooming from a wide angle end to a telephoto end, and letting NLi be the number of lens elements constituting an ith lens unit, a condition defined by $$NL3<NL2 \leq NL1$$

is satisfied; and wherein said third lens unit moves along a convex locus to the image side in zooming from the wide angle end to the telephoto end.

21. An image taking apparatus comprising:

a photoelectric conversion element; and an image taking lens for forming an image of an object on a photosensitive surface of the photoelectric conversion element, said image taking lens comprising said zoom lens defined in claim 20.

22. A zoom lens comprising, in order from an object side to an image side:

a first lens unit of a negative optical power, said first lens unit being a lens unit disposed at a position closest to the object side in the zoom lens;

a second lens unit of a positive optical power, said second lens unit being a lens unit disposed at a position following the first lens unit in order from the object side, said second lens unit having a cemented lens; and a third lens unit of a positive optical power, said third lens unit being a lens unit in order from the object side, said third lens unit moving along an optical axis for zooming, wherein a space between said first and second lens unit decreases, and a space between said second lens unit and said third lens unit increases in zooming from a wide angle end to a telephoto end, and letting NLi be the number of lens elements constituting an ith lens unit, a conditional expressions, $$NL3<NL2 \leq NL1$$

$$NL2=3$$

are satisfied.

23. An image taking apparatus comprising:

a photoelectric conversion element; and an image taking lens for forming an image of an object on a photosensitive surface of the photoelectric conversion element, said image taking lens comprising said zoom lens defined in claim 22.

24. A zoom lens comprising, in order from an object side to an image side:

a first lens unit of a negative optical power, said first lens unit being a lens unit disposed at a position closest to the object side in the zoom lens;

a second lens unit of a positive optical power; said second lens unit being a lens unit disposed at a position following the first lens unit in order from the object side, said second lens unit having a cemented lens formed by cementing a positive lens element to a negative lens element, a thickness of the positive lens element constituting the cemented lens being greater than a thickness of the negative lens element; and a third lens unit of a positive optical power, said third lens unit being a lens unit disposed at a position following the second lens unit in order from the object side, said third lens unit moving along an optical axis for zooming and focusing, wherein a space between said first and second lens unit decreases, and a space between said second lens unit and said third lens unit increases in zooming from a wide angle end to a telephoto end, and letting NLi be the number of lens elements constituting an ith lens unit, a condition defined by $$NL3<NL2 \leq NL1$$

is satisfied.

25. An image taking apparatus comprising:

a photoelectric conversion element; and an image taking lens for forming an image of an object on a photosensitive surface of the photoelectric conversion element, said image taking lens comprising said zoom lens defined in claim 24.

26. A zoom lens comprising, in order from an object side to an image side:

a first lens unit of a negative optical power, said first lens unit being a lens unit disposed at a position closest to the object side in the zoom lens, said first lens unit moving along an optical axis for zooming;

a second lens unit of a positive optical power; said second lens unit being a lens unit disposed at a position following the first lens unit in order from the object side, said second lens unit having a cemented lens formed by cementing a positive lens element to a negative lens element, a thickness of the positive lens element constituting the cemented lens being greater than a thickness of the negative lens element; and a third lens unit of a positive optical power, said third lens unit being a lens unit disposed at a position following the second lens unit in order from the object side, said third lens unit moving along the optical axis for zooming, wherein a space between said first and second lens unit decreases, and a space between said second lens unit and said third lens unit increases in zooming from a wide angle end to a telephoto end, and letting NLi be the number of lens elements constituting an ith lens unit, a condition defined by $$NL3<NL2 \leq NL1$$

is satisfied.

27. An image taking apparatus comprising:

a photoelectric conversion element; and an image taking lens for forming an image of an object on a photosensitive surface of the photoelectric conversion element, said image taking lens comprising said zoom lens defined in claim 26.

28. A zoom lens comprising, in order from an object side to an image side:

a first lens unit of a negative optical power, said first lens unit being a lens unit disposed at a position closest to the object side in the zoom lens;

a second lens unit of a positive optical power; said second lens unit being a lens unit disposed at a position following the first lens unit in order from the object side, said second lens unit having a cemented lens formed by cementing a positive lens element to a negative lens element, a thickness of the positive lens element constituting the cemented lens being greater than a thickness of the negative lens element; and a third lens unit of a positive optical power, said third lens unit being a lens unit disposed at a position following the second lens unit in order from the object side, said third lens unit moving along an optical axis for zooming, wherein lens units included by said zoom lens are only said first, second and third lens unit, wherein a space between said first and second lens unit decreases, and a space between said second lens unit and said third lens unit increases in zooming from a wide angle end to a telephoto end, and letting NLi be the number of lens elements constituting an ith lens unit, a condition defined by $$NL3 < NL2 \leqq NL1$$

is satisfied.

29. An image taking apparatus comprising:

a photoelectric conversion element; and an image taking lens for forming an image of an object on a photosensitive surface of the photoelectric conversion element, said image taking lens comprising said zoom lens defined in claim 28.

* * * * *

UNITED STATES PATENT AND TRADEMARK OFFICE
CERTIFICATE OF CORRECTION

PATENT NO. : 6,844,986 B2
DATED : January 18, 2005
INVENTOR(S) : Norihiro Nanba

It is certified that error appears in the above-identified patent and that said Letters Patent is hereby corrected as shown below:

Column 16,
Line 12, "ith lens it," should read -- "ith lens unit," --

Signed and Sealed this

Twelfth Day of July, 2005

JON W. DUDAS
*Director of the United States Patent and Trademark Office*